US012664641B2

(12) United States Patent
Zhao et al.

(10) Patent No.: US 12,664,641 B2
(45) Date of Patent: Jun. 23, 2026

(54) INTERFACE-BASED DEFECT INSPECTION USING SECOND HARMONIC GENERATION

(71) Applicant: KLA Corporation, Milpitas, CA (US)

(72) Inventors: Qiang Zhao, Milpitas, CA (US); Ming Di, Pleasanton, CA (US)

(73) Assignee: KLA Corporation, Milpitas, CA (US)

( * ) Notice: Subject to any disclaimer, the term of this patent is extended or adjusted under 35 U.S.C. 154(b) by 409 days.

(21) Appl. No.: 18/132,857

(22) Filed: Apr. 10, 2023

(65) Prior Publication Data

US 2024/0221149 A1     Jul. 4, 2024

Related U.S. Application Data

(60) Provisional application No. 63/449,491, filed on Mar. 2, 2023, provisional application No. 63/436,164, filed on Dec. 30, 2022.

(51) Int. Cl.
*G06T 7/00*     (2017.01)
*G01N 21/95*     (2006.01)
*G06T 7/55*     (2017.01)

(52) U.S. Cl.
CPC ............. *G06T 7/001* (2013.01); *G01N 21/95* (2013.01); *G06T 7/55* (2017.01); *G06T 2207/10152* (2013.01); *G06T 2207/30148* (2013.01)

(58) Field of Classification Search
None
See application file for complete search history.

(56) References Cited

U.S. PATENT DOCUMENTS

| | | | |
|---|---|---|---|
| 5,392,124 A | 2/1995 | Barbee et al. | |
| 6,297,880 B1 | 10/2001 | Rosencwaig et al. | |
| 7,158,284 B2 | 1/2007 | Alles et al. | |
| 10,613,131 B2 | 4/2020 | Koldiaev et al. | |

(Continued)

FOREIGN PATENT DOCUMENTS

| | | |
|---|---|---|
| CN | 109163648 A | 1/2019 |
| CN | 114693729 A | 7/2022 |

(Continued)

OTHER PUBLICATIONS

Korean Intellectual Property Office, International Search Report and Written Opinion received in International Application No. PCT/US2023/082399, Apr. 3, 2024, 9 pages.

(Continued)

*Primary Examiner* — David Ometz
(74) *Attorney, Agent, or Firm* — Suiter Swantz IP

(57) ABSTRACT

An inspection system may perform an inspection recipe by receiving reference SHG images of a reference structure based on a scan of the reference structure with an illumination beam and collecting second harmonic generation (SHG) light in response to the illumination beam, where the reference structure includes a multilayer structure including one or more inversion-symmetric materials. The system may further receive test SHG images of a test structure based on a scan of the test structure by illuminating the test structure with the illumination beam and collecting the SHG light in response to the illumination beam, where the test structure and the reference structure have a common design. The system may further identify defects in the test structure by comparing the test and reference SHG images.

46 Claims, 14 Drawing Sheets

(56) References Cited

U.S. PATENT DOCUMENTS

| | | | |
|---|---|---|---|
| 11,199,507 B2 | 12/2021 | Koldiaev et al. | |
| 11,293,965 B2 | 4/2022 | Koldiaev et al. | |
| 11,333,621 B2 | 5/2022 | Wack et al. | |
| 11,460,418 B2 | 10/2022 | Kuznetsov et al. | |
| 2006/0044641 A1 | 3/2006 | Alles et al. | |
| 2014/0192352 A1 | 7/2014 | Bamba et al. | |
| 2014/0300890 A1 | 10/2014 | Lange et al. | |
| 2016/0131594 A1* | 5/2016 | Koldiaev | G01N 21/63 |
| | | | 702/172 |
| 2017/0067830 A1 | 3/2017 | Adell et al. | |
| 2017/0205377 A1 | 7/2017 | Garnett et al. | |
| 2019/0259148 A1* | 8/2019 | Hunt | H04N 23/56 |
| 2020/0088784 A1 | 3/2020 | Lei | |
| 2020/0110029 A1 | 4/2020 | Lei | |
| 2020/0225151 A1 | 7/2020 | Wang et al. | |
| 2020/0292467 A1 | 9/2020 | Malkova et al. | |
| 2020/0400732 A1 | 12/2020 | Koldiaev et al. | |
| 2022/0034791 A1 | 2/2022 | Zhang | |
| 2022/0364850 A1 | 11/2022 | Adler | |

FOREIGN PATENT DOCUMENTS

| | | | | |
|---|---|---|---|---|
| WO | 2002065108 A2 | 8/2002 | | |
| WO | WO-02065108 A2 * | 8/2002 | | G01N 21/9501 |
| WO | WO-2019210265 A1 * | 10/2019 | | G01N 21/9505 |

OTHER PUBLICATIONS

U.S. Appl. No. 18/116,187, filed Mar. 1, 2023, Qiang Zhao.

Brahma et al., "The evolution of structure and defects in the implanted Si surface: Inspecting by reflective second harmonic generation," Department of Physics, National Cheng Kung University, Nov. 2, 2015, Elsevier B.V., Taiwan.

Cheema et al., "Enhanced ferroelectricity in ultrathin films grown directly on silicon," Apr. 22, 2020, 20 pages, Department of Materials Science and Engineering, University of California, Berkeley, CA, USA.

Damianos, "Second harmonic generation (SHG) for contactless characterization of dielectric-semiconductor Interfaces", Micro and nano technologies/Microelectronics, Université Grenoble Alpes, 2018, 160 pages.

Fangfang et al. "Application of second harmonic generation in characterization of 2D materials." Journal of Inorganic Materials, vol. 36, No. 10, 1022-1030, Oct. 2021, China.

Fomenko et al., "Optical second harmonic generation studies of ultrathin high-k dielectricstacks," Apr. 11, 2005, 9 pages, Journal of Applied Physics 97, American Institute of Physics.

Gieles et al., "Optical second-harmonic generation in thin film systems," Nov. 3, 2008, 20 pages, J. Vac. Sci. Technol. A 26(6), American Vacuum Society, The Netherlands.

Ionica et al., "Second Harmonic Generation: Non-Linear Optics for Characterization of Electrical Properties of Dielectric-on-Semiconductor Interfaces," 2022, 6 pages, ECS, The Electrochemical Society, France.

Lin et al., "Grain Size Effect of Monolayer MoS2 Transistors Characterized by Second Harmonic Generation Mapping," 2015, 4 pages, IEEE, Taiwan.

Nordlander et al., "Probing Ferroic States in Oxide Thin Films UsingOptical Second Harmonic Generation", Apr. 6, 2018, 29 pages, Appl. Sci. 2018, 8, 570, Zurich, Switzerland.

Price et al., "Charge trapping defects in film stacks Si/SiO2/Hf(1-x) SixO2 characterized by spectroscopic second-harmonic Generation," May 24, 2011, 12 pages, J. Vac. Sci. Technol. B 29, American Vacuum Society.

Ryabko et al., "Method for optical inspection of nanoscale objects based upon analysis of their defocused images and features of its practical implementation," Oct. 7, 2013, 7 pages, vol. 21, No. 21, Optical Society of America.

Soylu, "Exploiting Second Harmonic Generation for Microelectronics Interface Characterization," May 30, 2016, 79 pages, A Thesis Submitted to the Graduate School of Engineering and Sciences of İzmir Institute of Technology.

Tok et al., "Oscillatory optical second-harmonic generation from Si(001) surfaceduring thin-film epitaxy," Feb. 14, 2000, 4 pages, vol. 76, No. 7, American Institute of Physics.

Yoon et al., "Nanophotonic identification of defects buried in three-dimensional NAND flash memory devices," Jan. 2018, 8 pages, vol. 1, Nature Electronics, Macmillan Publishers Limited, part of Springer Nature.

Cristoloveanu et al., "A review of electrical characterization techniques for ultrathin FDSOI materials and devices," Solid-State Electronics, vol. 117, Mar. 2016, 27 pages.

Korean Intellectual Property Office, International Search Report and Written Opinion received in International Application No. PCT/US2023/036550, Feb. 28, 2024, 11 pages.

European Patent Office, Extended European Search Report for Application No. 23913429.9, dated Mar. 12, 2026, 8 pages.

* cited by examiner

108

304

304

302

Figure 8:
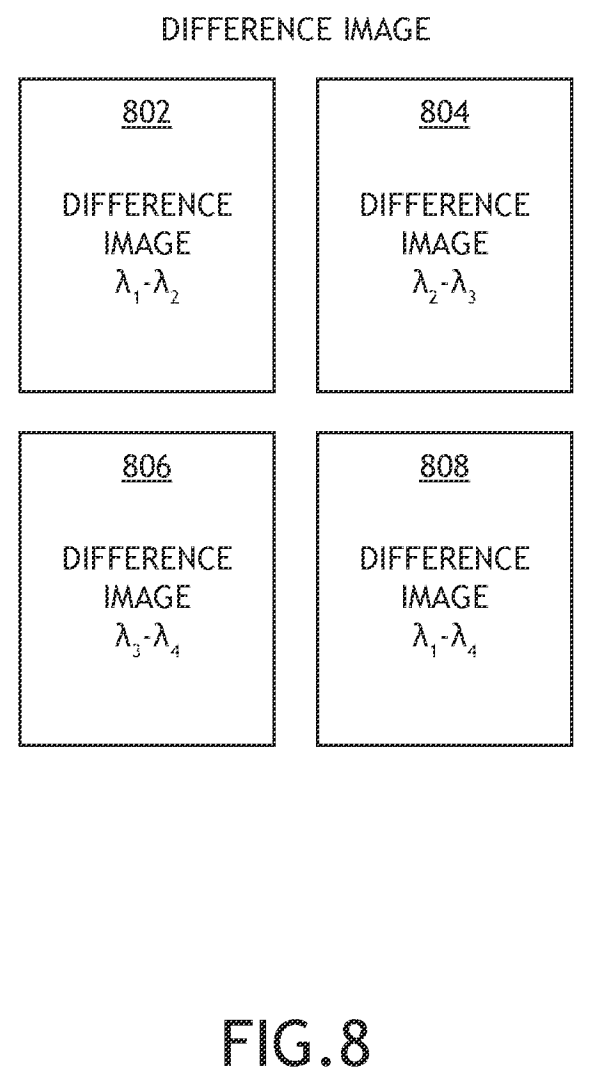

DIFFERENCE IMAGE

802
DIFFERENCE IMAGE $\lambda_1 - \lambda_2$

804
DIFFERENCE IMAGE $\lambda_2 - \lambda_3$

806
DIFFERENCE IMAGE $\lambda_3 - \lambda_4$

808
DIFFERENCE IMAGE $\lambda_1 - \lambda_4$

1002
SELECT A SAMPLE FOR INSPECTION

1004
SELECT INSPECTION PARAMETERS

1006
IDENTIFY ONE OR MORE DEFECTS IN THE SAMPLE USING THE SELECTED INSPECTION PARAMETERS

1008
CHECK WHETHER THE DEFECTS ARE CORRECTLY IDENTIFIED

1010
SAVE INSPECTION RECIPE

YES

NO

1012
SELECT NEW INSPECTION PARAMETERS

1014
IDENTIFY ONE OR MORE DEFECTS IN A SAMPLE USING THE SELECTED INSPECTION PARAMETERS

INTERFACE-BASED DEFECT INSPECTION USING SECOND HARMONIC GENERATION

CROSS-REFERENCE TO RELATED APPLICATION

The present application claims the benefit under 35 U.S.C. § 119(e) of U.S. Provisional Application Ser. No. 63/436,164 filed Dec. 30, 2022 and U.S. Provisional Application Ser. No. 63/449,491 filed Mar. 2, 2023, both of which are incorporated herein by reference in the entirety.

TECHNICAL FIELD

The present disclosure relates generally to defect inspection and, more particularly, to defect inspection using surface-selective second harmonic generation.

BACKGROUND

With the advancing of semiconductor manufacturing from finFET (fin field effect transistor) architecture to gate-all-around (GAA) architecture node in order to achieve better performance, lower power, smaller area and lower cost (PPAC), the associated process control requirements are also becoming more demanding. For example, such devices may include multiple levels of channel regions and relatively small spaces between channels, which simultaneously increases the number and types of potential defects that may occur during fabrication as well as the difficulty of detecting these defects. There is therefore a need to develop systems and methods to address the above deficiencies.

SUMMARY

An inspection system is disclosed in accordance with one or more illustrative embodiments of the present disclosure. In one illustrative embodiment, the system includes a controller communicatively coupled to a detector of an optical sub-system. In another illustrative embodiment, the controller receives one or more reference SHG images of one or more reference structures based on signals from a detector during a scan of the one or more reference structures with an illumination beam and collecting second harmonic generation (SHG) light in response to the illumination beam, where each of the one or more reference structures include a multilayer structure including one or more inversion-symmetric materials, and where the SHG light is associated with one or more interfaces between the one or more inversion-symmetric materials and additional features of the multilayer structure. In another illustrative embodiment, the controller receives one or more test SHG images of one or more test structures based on signals from the detector during a scan of the one or more test structures with the illumination beam and collecting the SHG light in response to the illumination beam, where the one or more test structures and the one or more reference structures have a common design. In another illustrative embodiment, the controller identifies defects in the one or more test structures by comparing the one or more test SHG images to the one or more reference SHG images.

An inspection system is disclosed in accordance with one or more illustrative embodiments of the present disclosure. In one illustrative embodiment, the system includes one or more illumination sources to generate an illumination beam. In another illustrative embodiment, the system includes a scanning sub-system including one or more elements configured to selectively direct the illumination beam to a sample at an off-axis incidence angle and further scan the illumination beam with respect to the sample along a scan direction. In another illustrative embodiment, the system includes a filter configured to block a spectrum of the illumination beam and allow a spectrum associated with second harmonic generation (SHG) of the illumination beam by at least a portion of the multilayer structure. In another illustrative embodiment, the system includes a detector to capture light associated with the second harmonic of the first illumination beam. In another illustrative embodiment, the system includes a controller communicatively coupled to the detector. In another illustrative embodiment, the controller receiving one or more reference SHG images of one or more reference structures based on signals from the detector during a scan of the one or more reference structures with the illumination beam and collecting second harmonic generation (SHG) light in response to the illumination beam, where each of the one or more reference structures includes a multilayer structure including one or more inversion-symmetric materials, and where the SHG light is associated with one or more interfaces between the one or more inversion-symmetric materials and additional features of the multilayer structure. In another illustrative embodiment, the controller receives one or more test SHG images of one or more test structures based on signals from the detector during a scan of the one or more test structures with the illumination beam and collecting the SHG light in response to the illumination beam, where the one or more test structures and the one or more reference structures have a common design. In another illustrative embodiment, the controller identifies defects in the one or more test structures by comparing the one or more test SHG images to the one or more reference SHG images.

A method is disclosed in accordance with one or more illustrative embodiments of the present disclosure. In one illustrative embodiment, the method includes generating one or more reference SHG images of one or more reference structures based on signals from a detector during a scan of the one or more reference structures with an illumination beam and collecting second harmonic generation (SHG) light in response to the illumination beam, where each of the one or more reference structures includes a multilayer structure including one or more inversion-symmetric materials, and where the SHG light is associated with one or more interfaces between the one or more inversion-symmetric materials and additional features of the multilayer structure. In another illustrative embodiment, the method includes generating one or more test SHG images of one or more test structures based on signals from the detector during a scan of the one or more test structures with the illumination beam and collecting the SHG light in response to the illumination beam, where the one or more test structures and the one or more reference structures have a common design. In another illustrative embodiment, the method includes identifying defects in the one or more test structures by comparing the one or more test SHG images to the one or more reference SHG images.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

FIG. 8 is a schematic diagram illustrating the generation of multiple difference images associated with multiple wavelengths, in accordance with one or more embodiments of the present disclosure.

DETAILED DESCRIPTION

Figure 1A:
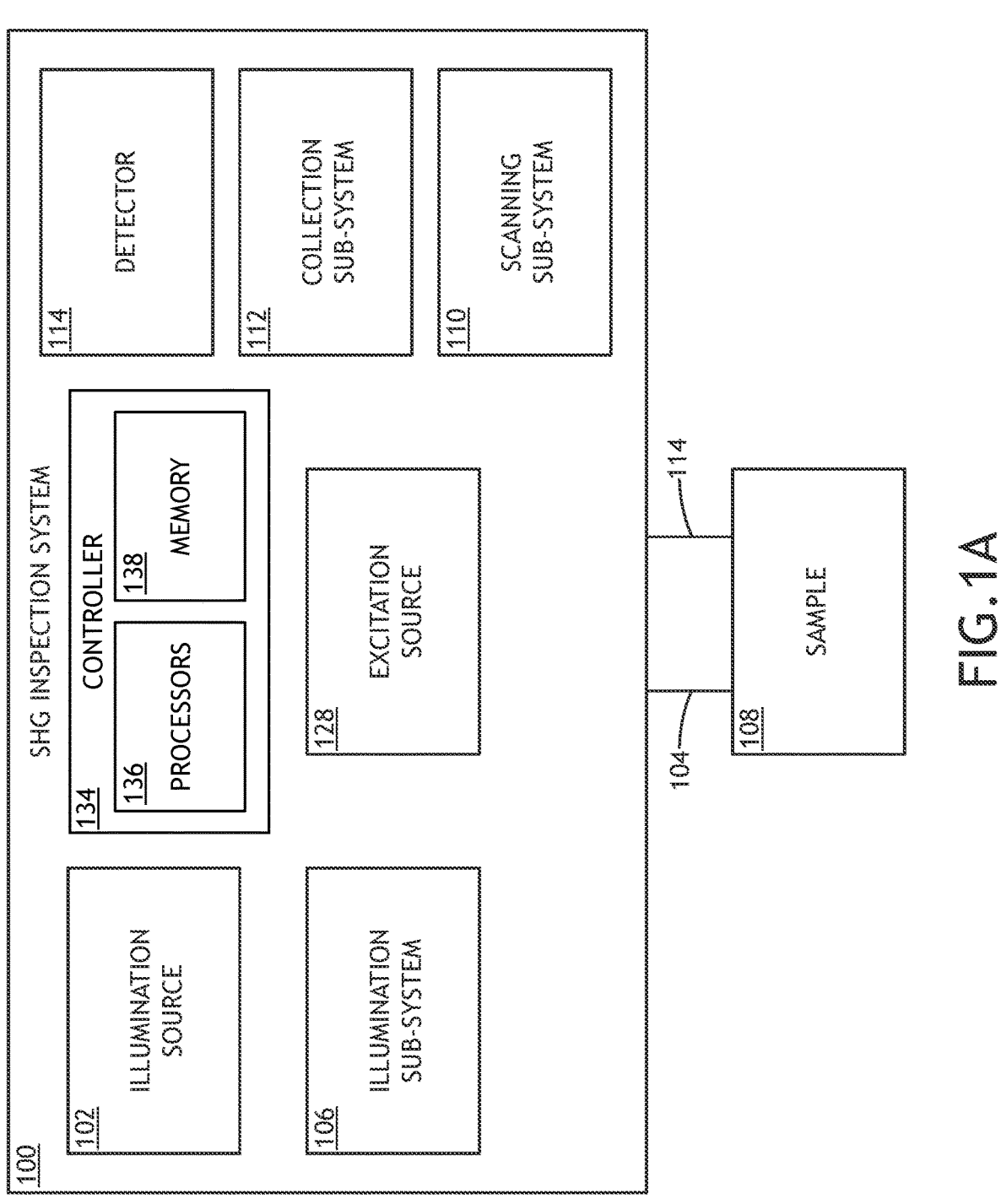
FIG. 1A is a block diagram of a second harmonic generation (SHG) inspection system, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods for surface-selective defect inspection based on second harmonic generation (SHG) techniques. In particular, embodiments of the present disclosure are directed to interface SHG measurements for surface-selective inspection of structures including thin film stacks including a substrate with inversion symmetry that precludes SHG in bulk form such as, but not limited to, silicon. For the purposes of the present disclosure, the term inversion-symmetric material is used to describe a material having inversion symmetry such that SHG is zero or weak within the bulk of the material. Put another way, the value of the second-order nonlinear susceptibility ($\chi^{(2)}$) is zero or sufficiently small so that SHG within the bulk of the material is negligible for a particular application (e.g., the intensity of SHG in the bulk of the material induced by an illumination beam with a selected intensity is negligible).

As one illustration, the crystalline structure of silicon is diamond-cubic lattice which has inversion symmetry (e.g., is centrosymmetric), so the electric field and polarization vectors in Si bulk are invariant with the inversion system and thus preclude SHG. However, SHG can be generated from the higher-order nonlinear response from the inversion symmetric material by an electric dipole on Si surface and electrical quadrupole response from Si bulk with an external electrical field applied. In particular, inversion symmetry is broken along the normal direction at the surface of silicon such that the second-order surface susceptibility at the interface is non-zero.

It is further contemplated herein that the strength of SHG generation at the interface of such an inversion-symmetric material is highly sensitive to the presence of additional dipoles near the interface. As used herein, the terms intensity and amplitude as related to SHG generation are used interchangeably to refer to the strength or amount of the SHG light. Some embodiments of the present disclosure are directed to systems and methods utilizing interface SHG to characterize the properties of one or more thin films adjacent to an inversion-symmetric substrate. Such measurements may thus provide an indirect measurement of such thin films based on their proximity to an inversion-symmetric substrate. In a general sense, such a technique may be suitable for identifying any type of defect that impacts interface SHG of a proximate interface of an inversion-symmetric substrate. In some cases, such defects are within 50 Angstroms or closer (e.g., 30 Angstroms, 20 Angstroms, or closer) to an interface. However, it is noted that these are merely examples and not limiting on the present disclosure.

It is further contemplated herein that such SHG measurements may be well suited for, but not limited to, surface-selective defect inspection of various gate all-around (GAA) field effect transistor (FET) devices such as, but not limited to, including GAA nanosheet FET devices, fork-sheet FET devices, complementary nanosheet FET device, metal-on-silicon FET (MOSFET) devices, ferroelectric FET devices, ferroelectric memory devices (FeRAM), 2D FET devices, 3D FET devices, or 3D dynamic random access memory (DRAM) devices. Further, such SHG measurements may be well suited for, but not limited to, defects in 2D materials including transition-metal dichalcogenides (e.g., $MoS_2$, $MoSe_2$, $MoTe_2$, $WS_2$, or $WSe_2$), or III-IV chalcogenides:

(e.g., InSe or GaSe). Such defects, particularly if they are buried, may also very difficult to be found using existing inspection techniques.

For example, gate regions of many FET devices typically include a thin film stack including one or more channel regions separated by a silicon substrate (e.g., a centrosymmetric material) as well as various thin films such as an interfacial layer (IL) of silicon dioxide ($SiO_2$), and a high-k dielectric material (e.g., $HfO_2$, $ZrO_2$, $HfSi_xO_y$, $HfO_xN_y$, or the like).

Such structures may be prone to various defects that are difficult to detect using traditional techniques such as, but not limited to, etch residues, channel bending, surface roughness after sacrificial SiGe release from a super lattice structure, or voids after a metal gate (MG) fill step. Many of these defects are buried defects in the high aspect ratio (HAR) stack and feature size is less than 10 nm. Detection of such defects have dramatically strained the capabilities of all current defect inspection solutions available in semiconductor fabs in terms of sensitivity, specificity, processing speed, and capture rate. However, such defects are typically located close to the channel and may critically impact device performance and yield and are thus not tolerated by process control.

As an illustration, existing optical inspection techniques (e.g., optical brightfield inspection, or the like) may be suitable for detecting some surface defects, but have limited application for buried defects or defects having a size substantially smaller than a wavelength of illumination more generally. As another illustration, scanning techniques such as, but not limited to, e-beam inspection, through-focus scanning optical microscopy (TSOM), or atomic force microscopy (AFM) techniques may generally provide high resolution for surface defects, but may suffer from limited resolution for buried defects, sample damage (particularly when using high landing voltages needed for characterizing buried defects), and/or low measurement throughput.

In some embodiments, interface SHG light from the interface of the inversion-symmetric substrate (e.g., silicon) is used to characterize the properties of adjacent materials or regions more generally. For example, interface SHG data of a sample of interest may be compared to interface SHG data from a reference sample for the detection of defects on the sample of interest. Additionally, the selective presence of a centrosymmetric substrate (e.g., silicon) in the regions of interest on the FET device (e.g., channel regions) not only provides the mechanism for interface SHG but also provides a highly selective measurement localized to this region of interest. Defect inspection based on such interface SHG signals may thus provide sensitive and selective performance, particularly in regions that may most directly impact device performance.

Some embodiments of the present disclosure are directed to various SHG inspection techniques or measurement modes. In some embodiments, an illumination beam is directed to a sample (e.g., including a FET device) and SHG light is captured using a detector and a filter to isolate the SHG signal (e.g., a bandpass filter) as the illumination beam is scanned across the sample. The illumination beam may generally be directed to the sample at any angle including a normal incidence angle or an off-axis incidence angle. In some embodiments, the sample is further exposed to additional stimuli to enhance the SHG signal and thus the signal to noise ratio (SNR) of the measurement. For example, the sample may be simultaneously illuminated with another light source and/or an electric field to excite dipoles that may contribute to interface SHG. In some embodiments, SHG signals associated with different wavelengths of incident illumination are measured during an inspection process. It is contemplated herein that a penetration depth of incident illumination into a sample may vary based on the wavelength such that the different wavelengths of incident illumination may probe for defects at different depths of the sample.

The systems and methods disclosed herein based on interface-based defect inspection is nondestructive, high throughput, and sensitive to disturbances of additional light excitation and external electric field at the surface/interfaces of channels with or without defects. The advantage of SHG behavior is very sensitive to the channel or silicon surface (or any inversion-symmetric material more generally) as shown below. As an illustration, the SHG behavior of a Si surface in EPI process strongly depends on its surface bonding with disilane or hydrogen in EPI growth process. As a result, it is even so sensitive to allow measurement of the SHG intensity difference upon the pressure of hydrogen from 0.8 to 1.5 Torr. More generally, the surface bonding with different species will produce different SHG behavior, which may be used as a basis for defect inspection.

Referring now to FIGS. 1A-10, systems and methods for selective metrology using SHG are described in greater detail, in accordance with one or more embodiments of the present disclosure.

Figure 1B:
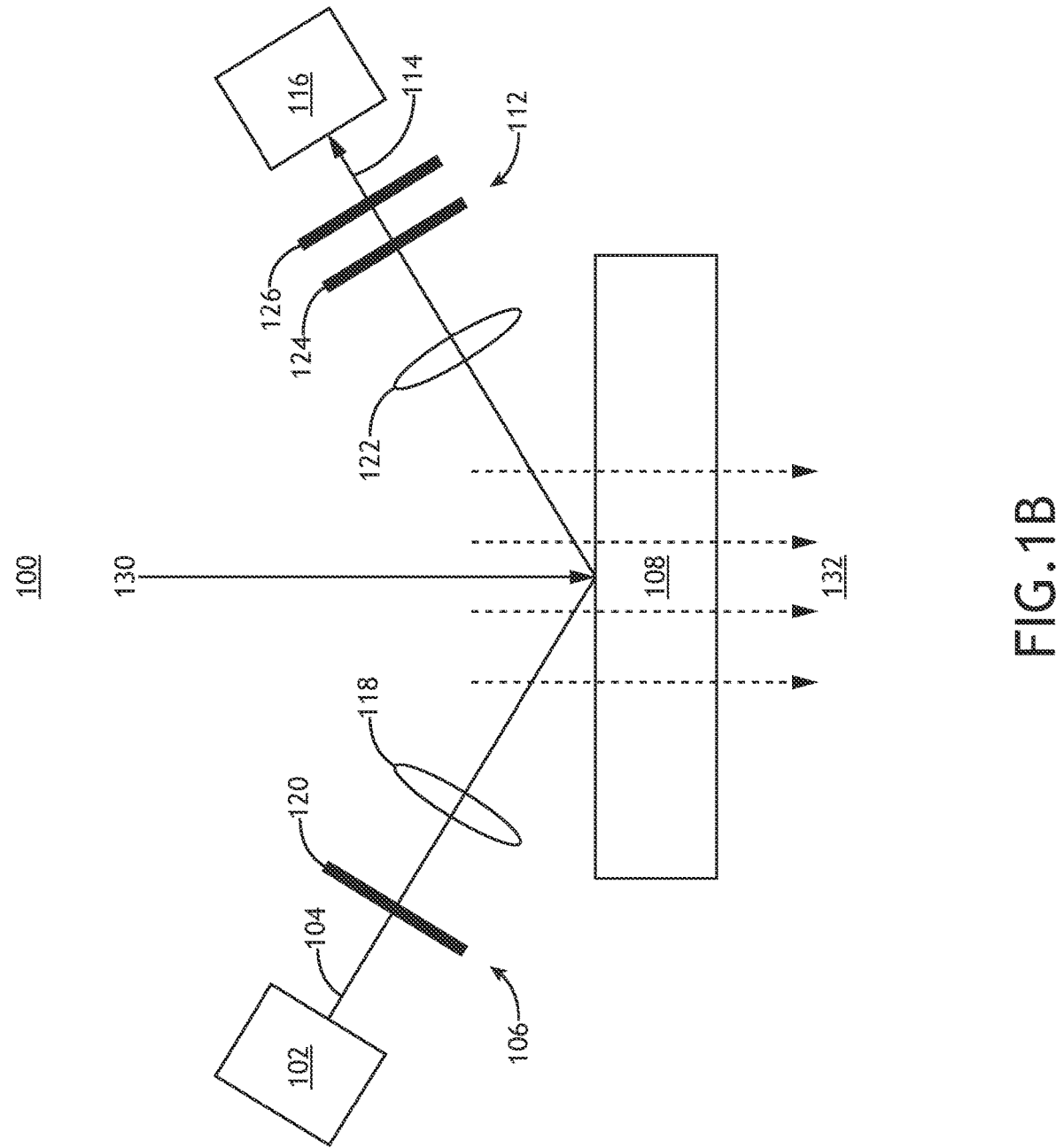
FIG. 1B is a simplified schematic of a SHG inspection system, in accordance with one or more embodiments of the present disclosure.

FIG. 1A is a block diagram of an SHG inspection system 100, in accordance with one or more embodiments of the present disclosure. FIG. 1B is a simplified schematic of an SHG inspection system 100, in accordance with one or more embodiments of the present disclosure.

In some embodiments, the SHG inspection system 100 includes an illumination source 102 configured to generate an illumination beam 104, an illumination sub-system 106 including one or more optical elements to direct the illumination beam 104 to a sample 108, a scanning sub-system 110 configured to scan the illumination beam 104 with respect to the sample 108 (or vice versa), a collection sub-system 112 including one or more optical elements to direct SHG light 114 generated by the sample 108 in response to the illumination beam 104 to a detector 116. For example, the spectrum of the SHG light 114 may have twice the frequency or half the wavelength of the spectrum of the illumination beam 104.

The illumination source 102 may be any light source known in the art suitable for generating an illumination beam 104 suitable for inducing SHG light 114 in the sample 108. In some embodiments, the illumination source 102 is a laser source such that the illumination beam 104 is a coherent laser beam.

The illumination beam 104 may further have any selected spectral content. For example, the illumination beam 104 may have a selected wavelength (or center wavelength) in any spectral range such as, but not limited to, ultraviolet (UV), visible, infrared (IR), or near-IR. In some embodiments, the illumination source 102 may include a laser source. In some embodiments, the illumination source 102 is a tunable source (e.g., a tunable laser source or a tunable non-laser source). In this way, the illumination beam 104 may have a tunable wavelength, center wavelength, or spectra more generally. For example, the illumination source 102 may include, but is not limited to, a Ti:Sapphire laser source or a Yb-KGW laser source.

The illumination beam 104 may generally have any temporal profile. In some embodiments, the illumination beam 104 is formed as a series of pulses. Such pulses may have any pulse duration. As a non-limiting example, the illumination beam 104 may have pulse durations on the order of picoseconds, femtoseconds, or attoseconds, which are commonly referred to as ultrashort pulses. Such ultra-short pulses may beneficially provide high peak powers suitable for efficiently inducing SHG in the sample 108. Such pulses may also have any repetition rate such as, but not limited to, a repetition rate in the range of kHz to MHz.

The illumination sub-system 106 may include any combination of optical components suitable for directing the illumination beam 104 to the sample 108 and/or controlling properties of the illumination beam 104. For example, the illumination sub-system 106 may include one or more lenses 118 to control a spot size of the illumination beam 104 on the sample 108. As another example, the illumination sub-system 106 may include one or more illumination-controlling components 120 to control parameters of the illumination beam 104 such as, but not limited to, intensity, wavelength (or spectrum more generally), polarization, spot size on the sample 108, or angle of incidence on the sample 108. For example, the illumination-controlling components 120 may include, but are not limited to, one or more polarizers, one or more spectral filters, one or more spatial filters, or one or more apodizers. Such illumination-controlling components 120 may be placed at any suitable location including, but not limited to, a pupil plane or a field plane. Further, the illumination sub-system 106 may direct the illumination beam 104 to the sample at any incidence angle including a normal incidence angle (e.g., as depicted in FIG. 1B) or an off-axis incidence angle.

The scanning sub-system 110 may include any components or combinations of components suitable for providing relative motion between the illumination beam 104 and the sample 108. In some embodiments, the scanning sub-system 110 includes a translation stage to translate the sample 108 (e.g., control the position of the sample 108 during a scan) with respect to the illumination sub-system 106 (e.g., a focusing lens, or the like). In some embodiments, the scanning sub-system 110 includes one or more optical elements to scan the illumination beam 104 across the sample 108 (e.g., beam-scanning optics, or the like) such as, but not limited to, galvo mirrors coupled with an f-theta lens.

In some embodiments, the illumination sub-system 106 provides that the illumination beam 104 has an asymmetric spot size on the sample 108. For example, the illumination beam 104 may be extended along a direction perpendicular to a scan direction (e.g., a direction of relative motion between the illumination beam 104 and the sample 108) provided by the scanning sub-system 110. As an illustration, the illumination beam 104 may be focused to a line extended in the direction perpendicular to the scan direction. Such a configuration is illustrated in FIG. 1B.

The collection sub-system 112 may include any combination of optical components suitable for directing SHG light 114 from the sample 108 to the detector 116. In some embodiments, the collection sub-system 112 includes one or more lenses 122 to collect light from the sample 108. In some embodiments, the collection sub-system 112 includes one or more collection-controlling components 124 to control parameters of collected light such as, but not limited to, intensity, wavelength (or spectrum more generally), polarization, collection location on the sample 108, or angle of collection. For example, the collection-controlling components 124 may include, but are not limited to, one or more polarizers, one or more spectral filters, one or more spatial filters, or one or more apodizers.

In some embodiments, the illumination-controlling components 120 may include a first polarizer and the collection-controlling components 124 may include a second polarizer. For example, the first polarizer may control a polarization of the illumination beam 104 incident on the sample 108 and a second polarizer may control a polarization of SHG light 114 incident on the detector 116. Further, the orientation of at least one of the first polarizer or the second polarizer may be adjusted to maximize an intensity of the SHG light 114 detected by the detector 116.

In some embodiments, the collection sub-system 112 (e.g., the collection-controlling components 124) includes a filter 126 to selectively pass the SHG light 114 to the detector 116 or at least block reflected light associated with the spectrum of the illumination beam 104. For example, the filter 126 may include one or more spectral filters (e.g., dielectric filters, or the like) such as, but not limited to, a bandpass filter to selectively pass the SHG light 114, a band reject filter to selectively reject the spectrum of the illumination beam 104, or a low-pass filter (e.g., a low-pass wavelength filter) with a cutoff to block the spectrum of the illumination beam 104 and pass the spectrum of the SHG light 114. As another example, the filter 126 may include a dispersive element to spectrally disperse light emanating from the sample 108 followed by a spatial filter to selectively pass the SHG light 114.

In some embodiments, various components of the illumination sub-system 106 and the collection sub-system 112 are coupled or operated in tandem. For example, the SHG process is dependent on the polarization of the illumination beam 104. Accordingly, the illumination sub-system 106 may include a polarizer (e.g., one of the illumination-controlling components 120) configured to provide a polarization of the illumination beam 104 that maximizes an intensity of the SHG light 114. The collection sub-system 112 may then include a polarizer (e.g., one of the collection-controlling components 124) configured to isolate the filter 126 with the associated polarization.

The detector 116 may include any component or combination of components suitable for detecting the SHG light 114 and providing measurement data associated with the SHG light 114. In some embodiments, the detector 116 includes a single-pixel device such as, but not limited to, a photodetector, an avalanche photodiode, or a photo-multiplier tube. In some embodiments, the detector 116 includes a multi-pixel device such as, but not limited to, a charge-coupled device (CCD) or a complementary metal-oxide-semiconductor (CMOS) device. In some embodiments, the detector 116 includes a spectrometer suitable for measuring a spectrum of light emanating from the sample 108 in response to the illumination beam 104. In general, the SHG inspection system 100 may include any number or types of detectors 116. In this way, the SHG inspection system 100 may more generally be suitable for additional measurements beyond SHG measurements such as, but not limited to, Raman spectroscopy or photoluminescence.

In some embodiments, the SHG inspection system 100 includes one or more excitation sources 128 to enhance SHG generation by the illumination beam 104. The excitation sources 128 may include any type of source suitable for enhancing SHG generation associated with the illumination beam 104 such as, but not limited to, an additional illumination source or an electric field source.

In some embodiments, an excitation source 128 includes an additional illumination source configured to generate an additional illumination beam 130. In this configuration, the SHG inspection system 100 may direct the additional illumination beam 130 to the same portion of the sample 108 at the same or a different illumination angle (e.g., the illumination beam 104 and the additional illumination beam 128 may overlap during a scan). For example, FIG. 1B depicts an additional illumination beam 130 incident on the sample 108 at a normal incidence angle. As a result, the additional illumination beam 130 may generate charge separation at one or more interfaces of the sample 108 and thus induce a DC electric field, which may contribute to the SHG process and may thus increase the intensity of the SHG light 114.

In some embodiments, an excitation source 128 includes an electric field source (not explicitly shown in FIG. 1B) configured to generate an electric field 132. For example, the electric field 132 may be oriented perpendicular to a surface of the sample 108 to modify the SHG behavior of the sample 108. It is recognized that electric-filed-induced second harmonic generation (EFISH) is a third-order nonlinear process depending on the interaction between the electric field and incident photons. In some embodiments, a DC electric field 132 is applied to a symmetry-broken surface to enhance the generation of interface SHG light 114 associated with the illumination beam 104. In particular, the SHG light 114 may be generated by interface SHG processes and enhanced by the contribution of third-order electric susceptibility due to the external electric field 132. It is contemplated herein that EFISH techniques have been utilized generally to analyze material properties, but not for surface-selective SHG metrology as disclosed herein.

In some embodiments, the SHG inspection system 100 further includes a controller 134 with one or more processors 136 configured to execute program instructions maintained on memory 138 (e.g., a memory medium). The controller 134 may be communicatively coupled with any of the components of the SHG inspection system 100 such as, but not limited to the detector 116. In this way, the controller 134 may execute program instructions causing the one or more processors 136 to perform any steps disclosed herein. For example, the controller 134 may perform an inspection recipe, receive metrology data from the detector 116 associated with SHG light 114 from the sample 108, or receive reference and test SHG images from reference and test structures and identify defects in the test structures based on the reference and test SHG images.

The one or more processors 136 of a controller 134 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FP-GAs), or one or more digital signal processors (DSPs)). In this sense, the one or more processors 136 may include any device configured to execute algorithms and/or instructions (e.g., program instructions stored in memory). In one embodiment, the one or more processors 136 may be embodied as a desktop computer, mainframe computer system, workstation, image computer, parallel processor, networked computer, or any other computer system configured to execute a program configured to operate or operate in conjunction with the SHG inspection system 100, as described throughout the present disclosure.

Moreover, different subsystems of the SHG inspection system 100 may include a processor or logic elements suitable for carrying out at least a portion of the steps described in the present disclosure. Therefore, the above description should not be interpreted as a limitation on the embodiments of the present disclosure but merely as an illustration. Further, the steps described throughout the present ent disclosure may be carried out by a single controller 134 or, alternatively, multiple controllers. Additionally, the controller 134 may include one or more controllers housed in a common housing or within multiple housings. In this way, any controller or combination of controllers may be separately packaged as a module suitable for integration into the SHG inspection system 100.

The memory 138 may include any storage medium known in the art suitable for storing program instructions executable by the associated one or more processors 136. For example, the memory 138 may include a non-transitory memory medium. By way of another example, the memory 138 may include, but is not limited to, a read-only memory (ROM), a random access memory (RAM), a magnetic or optical memory device (e.g., disk), a magnetic tape, a solid-state drive, and the like. It is further noted that the memory 138 may be housed in a common controller housing with the one or more processors 136. In one embodiment, the memory 138 may be located remotely with respect to the physical location of the one or more processors 136 and the controller 134. For instance, the one or more processors 136 of the controller 134 may access a remote memory (e.g., server), accessible through a network (e.g., internet, intranet and the like).

Referring now to FIGS. 2-10, interface SHG for defect inspection is described in greater detail, in accordance with one or more embodiments of the present disclosure.

Figure 2:
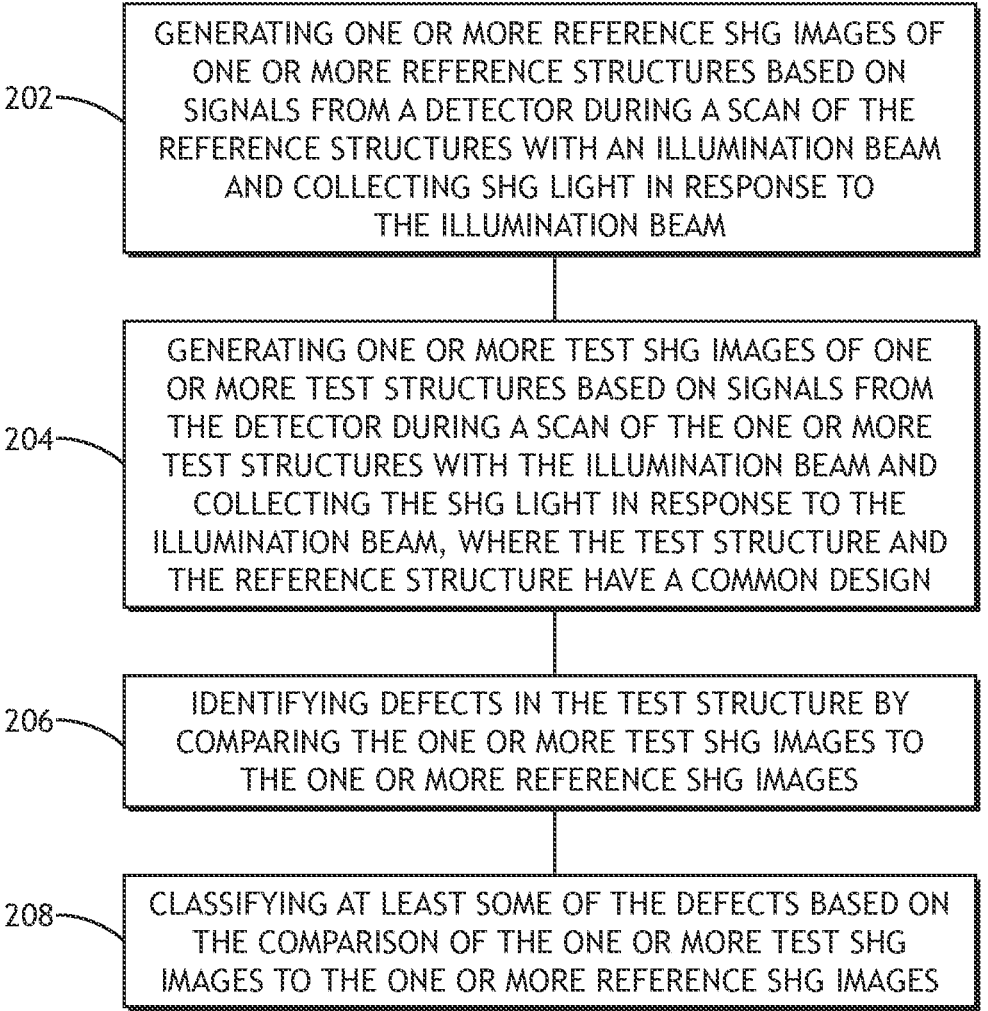
FIG. 2 is a flow diagram illustrating steps performed in a method for defect inspection, in accordance with one or more embodiments of the present disclosure.

FIG. 2 is a flow diagram illustrating steps performed in a method 200 for defect inspection, in accordance with one or more embodiments of the present disclosure. Applicant notes that the embodiments and enabling technologies described previously herein in the context of the SHG inspection system 100 should be interpreted to extend to the method 200. It is further noted, however, that the method 200 is not limited to the architecture of the SHG inspection system 100.

In some embodiments, the method 200 includes a step 202 of generating one or more reference SHG images of one or more reference structures based on signals from a detector 116 during a scan of the one or more reference structures by illuminating the one or more reference structures with an illumination beam 104 and collecting SHG light 114 in response to the illumination beam 104. Further, the reference structure may include a multilayer structure including one or more inversion-symmetric materials, where the SHG light 114 is associated with one or more interfaces between the one or more inversion-symmetric materials and additional features of the multilayer structure. In some embodiments, the method 200 includes a step 204 of generating one or more test SHG images of one or more test structures based on signals from the detector during a scan of the one or more test structures by illuminating the one or more test structures with the illumination beam 104 and collecting the SHG light 114 in response to the illumination beam 104, where the test structure and the reference structure have a common design. In some embodiments, the method 200 includes a step 206 of identifying defects in the test structure by comparing the one or more test SHG images to the one or more reference SHG images. For example, the step 206 may include identifying defects based on differences between the reference and test images.

In some embodiments, the reference structure is known to be free from defects of interest and the test structure may have the same design (e.g., intended layout of features) as the reference structure. As a result, the reference SHG image and the test SHG image may be equivalent within selected tolerances when the test structure is free of defects. For example, it is contemplated herein that that the reference and test SHG images may acceptably differ based on acceptable variations of the reference and test structures within the design and/or fabrication tolerances. However, it is contemplated herein that defects in the reference structure may be identified by measurable differences between the reference and test images.

The one or reference images may be generated using a variety of techniques within the spirit and scope of the present disclosure. In some embodiments, a reference image is generated based on a single reference structure, which may be known to be free from defects. In some embodiments, a reference image is generated based on a combination (e.g., average, or the like) of multiple images of one or more reference features on the same or different samples 108.

Additionally, the reference and test SHG images may be generated using SHG light 114 captured using any suitable technique or combination of techniques. In some embodiments, reference and test SHG images are generated based on illumination of the sample 108 with an illumination beam 104 and capturing the associated SHG light 114 without using any additional excitation sources 128. In some embodiments, reference and test SHG images are generated based on illumination of the sample 108 with an illumination beam 104 and capturing the associated SHG light 114 one or more additional excitation sources 128. For example, reference and test SHG images may be generated using SHG light 114 in the presence of an additional illumination beam 130 and/or an electric field 132 (e.g., as depicted in FIG. 1B). Further, multiple sets of reference and test SHG images may be generated using different configurations of the illumination beam 104, an additional illumination beam 130, or an electric field 132.

Referring now to FIGS. 3-9D, defects suitable for inspection based on measurement of SHG light 114 are described in greater detail, in accordance with one or more embodiments of the present disclosure. For example, defects described in FIGS. 3-9D may be detected by the SHG inspection system 100 and/or the method 200. However, it is to be understood that the defects illustrated in FIGS. 3-9D are merely illustrative and not limiting of the types of defects that may be detected using the SHG inspection system 100 and/or the method 200.

Figure 3:
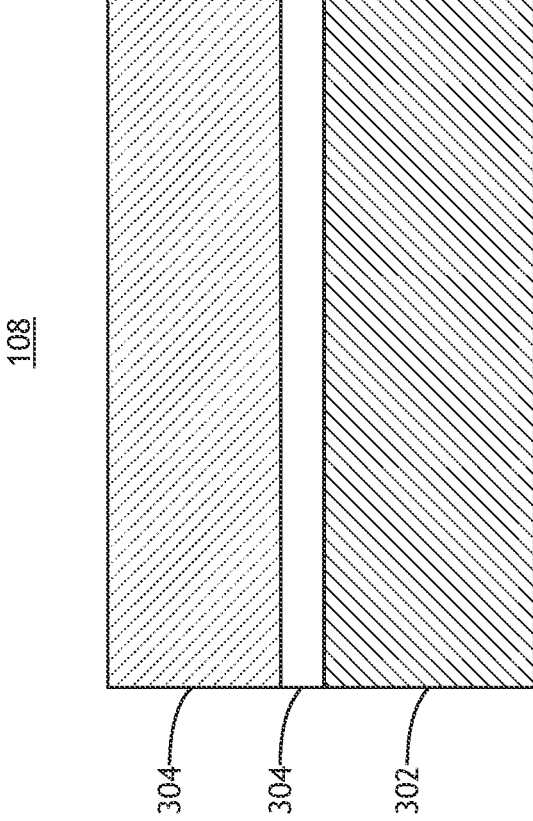
FIG. 3 is a side view of a schematic of a sample suitable for interface SHG defect inspection, in accordance with one or more embodiments of the present disclosure.

FIG. 3 is a side view of a schematic of a sample 108 suitable for interface SHG defect inspection, in accordance with one or more embodiments of the present disclosure.

In some embodiments, the sample 108 includes at least one inversion-symmetric material 302 (e.g., an inversion-symmetric substrate) and one or more films 304 (e.g., thin films) of additional materials.

The inversion-symmetric material 302 may include any type of material known in the art possessing inversion symmetry such as, but not limited to, a centrosymmetric material (e.g., a centrosymmetric crystal) or an isotropic material (e.g., a glass). In this way, SHG may be zero or weak within the bulk of the inversion-symmetric material 302. Further, the inversion-symmetric material 302 may have any material phase, such as, but not limited to, crystal, glass, or ceramic. In some embodiments, the inversion-symmetric material 302 is reflective for the wavelengths of at least the SHG light 114 such that the SHG light 114 is reflected from the sample 108 and collected by a collection sub-system 112 on a common side of the sample 108 as the illumination sub-system 106. In some embodiments, the inversion-symmetric material 302 includes a crystalline semiconductor substrate such as, but not limited to, silicon.

The one or more films 304 may include any type of material known in the art. In some embodiments, the one or more films 304 are also inversion-symmetric. In some embodiments, the one or more films 304 include $SiO_2$ (e.g., an IL) and/or a high-k material such as, but not limited to $HfO_2$, $ZrO_2$, $HfSi_xO_y$, or $HfO_xN_y$. In some embodiments, a sample 108 may include ferroelectric thin film stacks with one or more $HfO_2$ films 304 doped with materials such as, but not limited to, Zr, Al, Gd, La, Si, Sr, and Y. In some embodiments, a sample 108 may include one or more of $HfO_2$ films 304 with oxides such as, but not limited to, $SiO_2/HfO_2/AlO_3$ or $HfO_2/ZrO_2/HfO_2$. In some embodiments, a sample 108 may include transition-metal dichalcogenides such as, but not limited to, $MoS_2$, $MoSe_2$, $MoTe_2$, $WS_2$ or $WSe_2$. In some embodiments, a sample 108 may include III-IV chalcogenides such as, but not limited to InSe or GaSe. In some embodiments, the inversion-symmetric material 302 may be at least partially surrounded by air or another gas.

It is contemplated herein that interface SHG generated at the interface between an inversion-symmetric material 302 and surrounding materials (e.g., air, films 304, or the like) may be the basis for surface-selective defect inspection in portions of a sample 108 that include the inversion-symmetric material 302. As a result, SHG defect inspection may be suitable for thin film metrology of a wide variety of devices and materials (e.g., features on a sample 108) such as, but not limited to, GAA FET devices such as, but not limited to, including GAA nanosheet FET devices, fork-sheet FET devices, complementary nanosheet FET device, MOSFET, devices, ferroelectric FET devices, ferroelectric memory devices (FeRAM), 2D FET devices, or 3D dynamic random access memory (DRAM) devices.

Figures 4A, 4B:
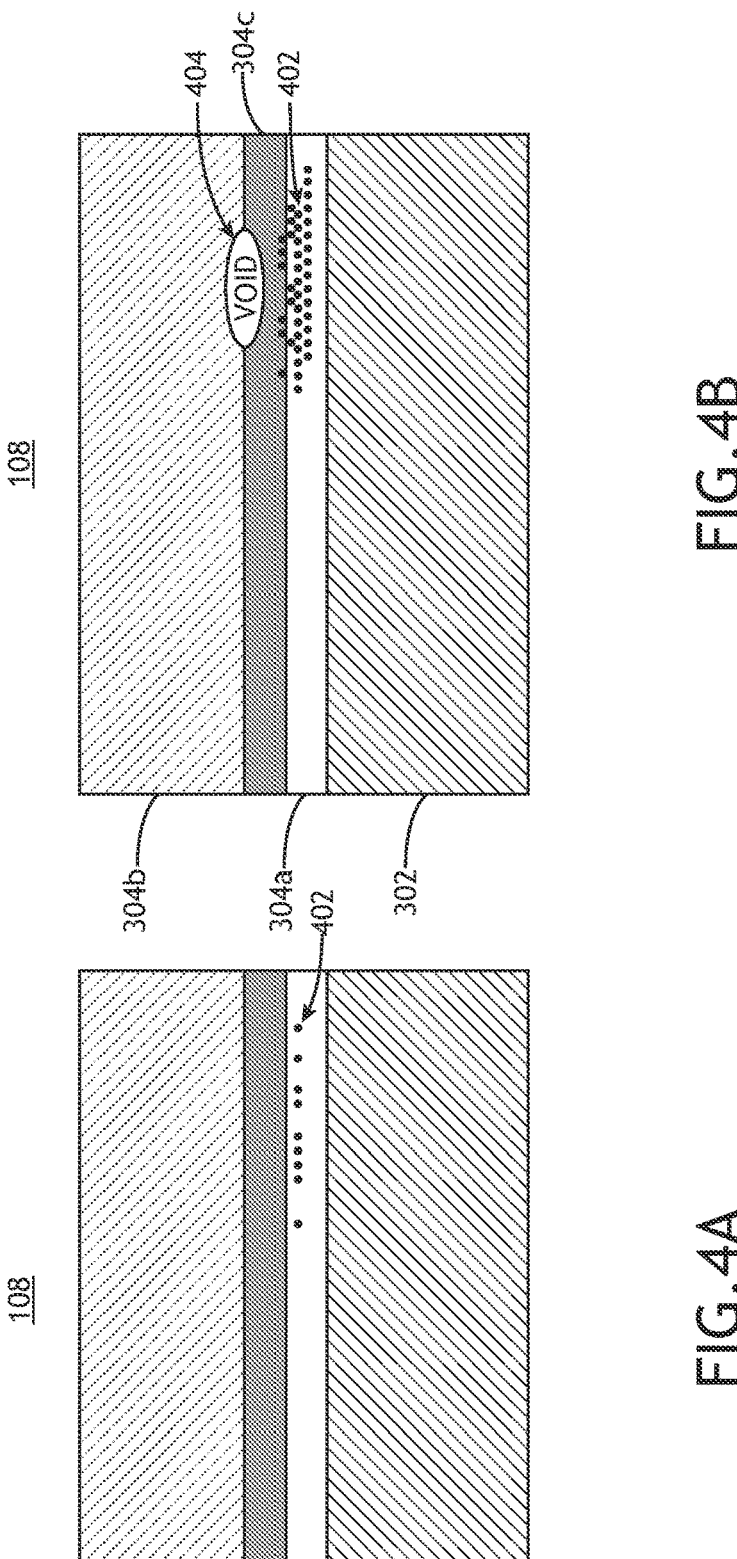
FIG. 4A is a side view schematic of an inversion-symmetric material formed from silicon with a first film formed as an interfacial layer, a second film formed as a high-k material, and a third film formed as a metal gate layer, in accordance with one or more embodiments of the present disclosure.
FIG. 4B is a side view schematic of the materials in FIG. 4A further including a void, in accordance with one or more embodiments of the present disclosure.

FIGS. 4A and 4B are side views of a thin film stack formed from materials common to at least some FET devices. In particular, FIG. 4A is a side view schematic of an inversion-symmetric material 302 formed from silicon with a first film 304a formed as an interfacial layer (IL) (e.g., from $SiO_2$), a second film 304b formed as a high-k material (e.g., an annealed high-k material and/or a high-k material after fabrication of an interfacial dipole engineering (IDE) layer), and a third film 304c formed as a metal gate (MG) layer, in accordance with one or more embodiments of the present disclosure.

As depicted in FIG. 4A an interface associated with the films 304 on the inversion-symmetric material 302 may have electric dipoles 402 that may contribute to interface SHG. The electric dipoles 402 in FIG. 4A may be primarily associated with the breakage of inversion symmetry at the interface of the inversion-symmetric material 302. In some applications, the number and/or concentration of electric dipoles 402 is further controlled by an interdigitated electrode (IDE layer) (not explicitly shown). Such IDE layers may be fabricated for various purposes such as, but not limited to, modifying a threshold voltage ($V_t$) of the FET. Further, this threshold voltage may be particularly sensitive to the electric dipoles 402 in a gate region as well as defects in this region.

It is contemplated herein that interface SHG associated with an interface of an inversion-symmetric material 302 may further be sensitive to defects that are not directly related to electric dipoles 402, but nonetheless impact the local distribution of electric dipoles 402 and thus the local distribution of SHG light 114. As an illustration, FIG. 4B is a side view schematic of the materials in FIG. 4A further including a void 404, in accordance with one or more embodiments of the present disclosure. Such a defect may result in a localized change of the electric dipoles 402 (e.g., a charge/trap distribution) on the adjacent interface of the inversion-symmetric material 302 (here, silicon) and thus a localized modification of the properties of SHG light 114. Further, the presence of such a defect in a different location may result in different behavior. For example, the presence of such a defect in a location without the same inversion-symmetric material 302 may exhibit substantially different SHG behavior and potentially provide no measurable SHG light 114 at all. In this way, the systems and methods disclosed herein based on interface SHG may provide selective defect inspection in locations surrounding such an inversion-symmetric material 302. Further, it is to be understood that the depiction of a void 404 in FIG. 4B is merely illustrative and that any type of defect that impacts the local distribution of electric dipoles 402 near an interface of an inversion-symmetric material 302 and thus the local distribution of SHG light 114 on a sample 108 may be detectable using the systems and methods disclosed herein.

It is further contemplated herein that an inversion-symmetric material 302 such as, but not limited to, silicon, may be selectively present in particular areas of interest of semiconductor devices such as, but not limited to gate/channel regions of FET devices, GAA FET devices, or the like. As a result, the systems and methods disclosed herein may provide selective defect inspection in areas that may critically impact device performance.

Figure 5:
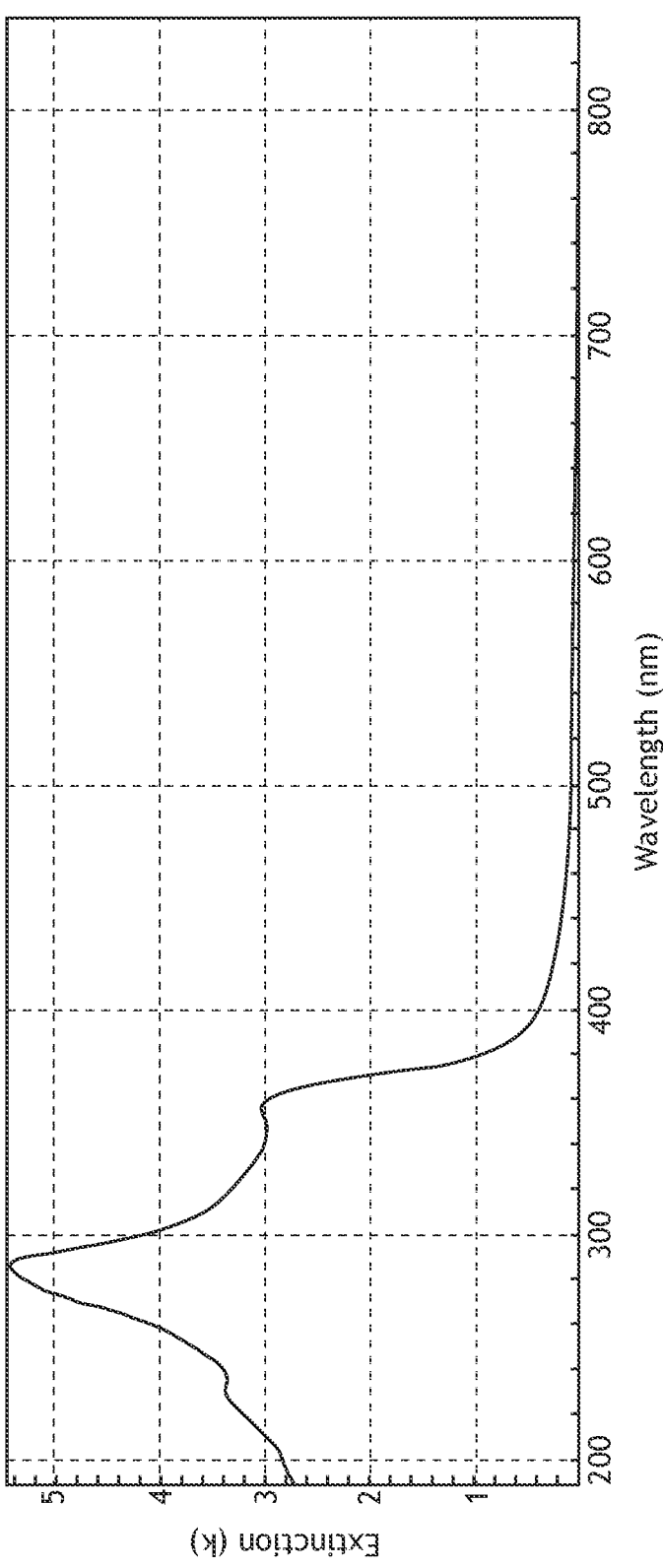
FIG. 5 is a plot of the optical extinction coefficient as a function of wavelength for silicon, in accordance with one or more embodiments of the present disclosure.
Figure 6:
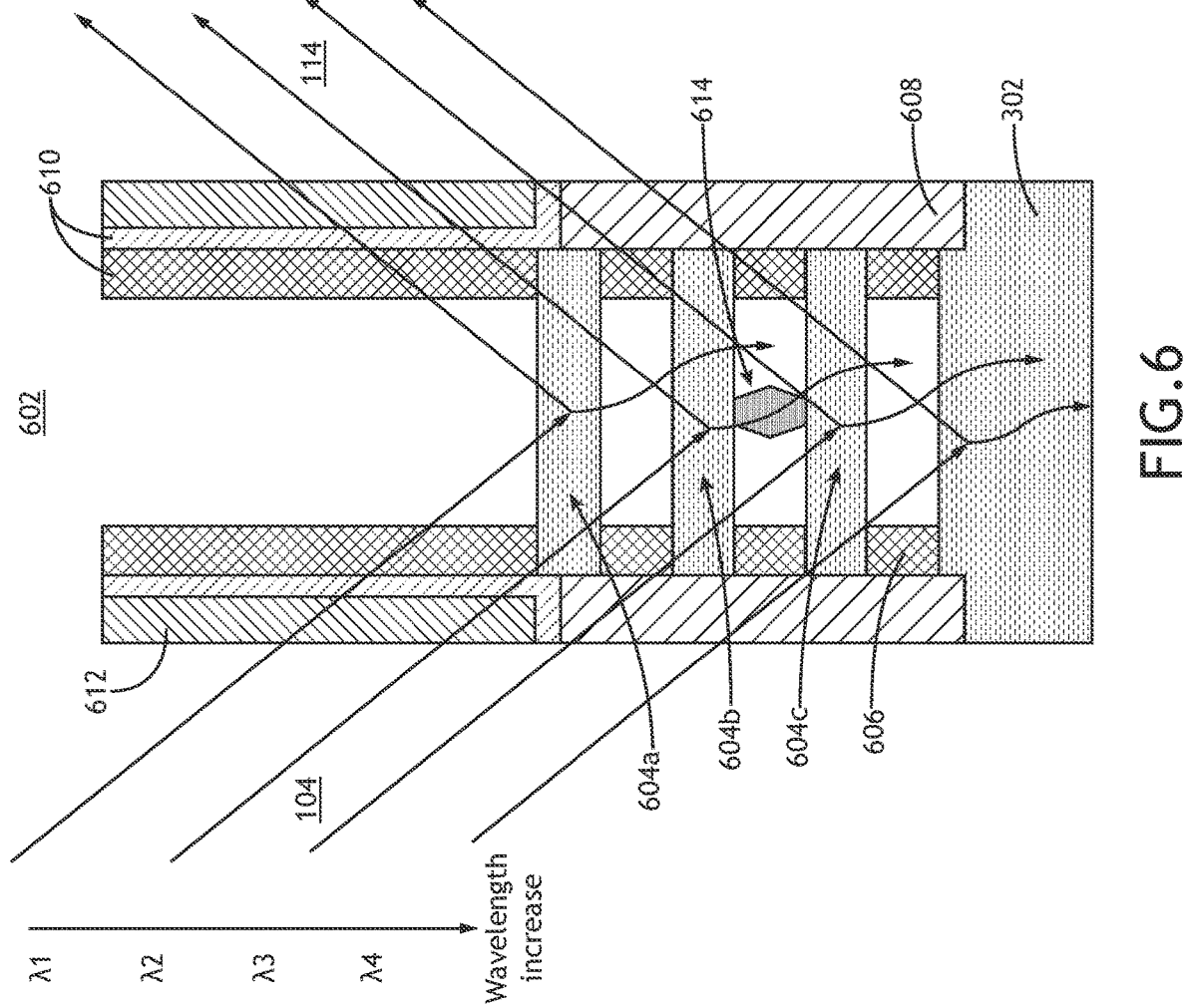
FIG. 6 is a schematic side view of a gate region of a multi-channel field-effect transistor (FET) at an intermediate process step, in accordance with one or more embodiments of the present disclosure.
Figure 7:
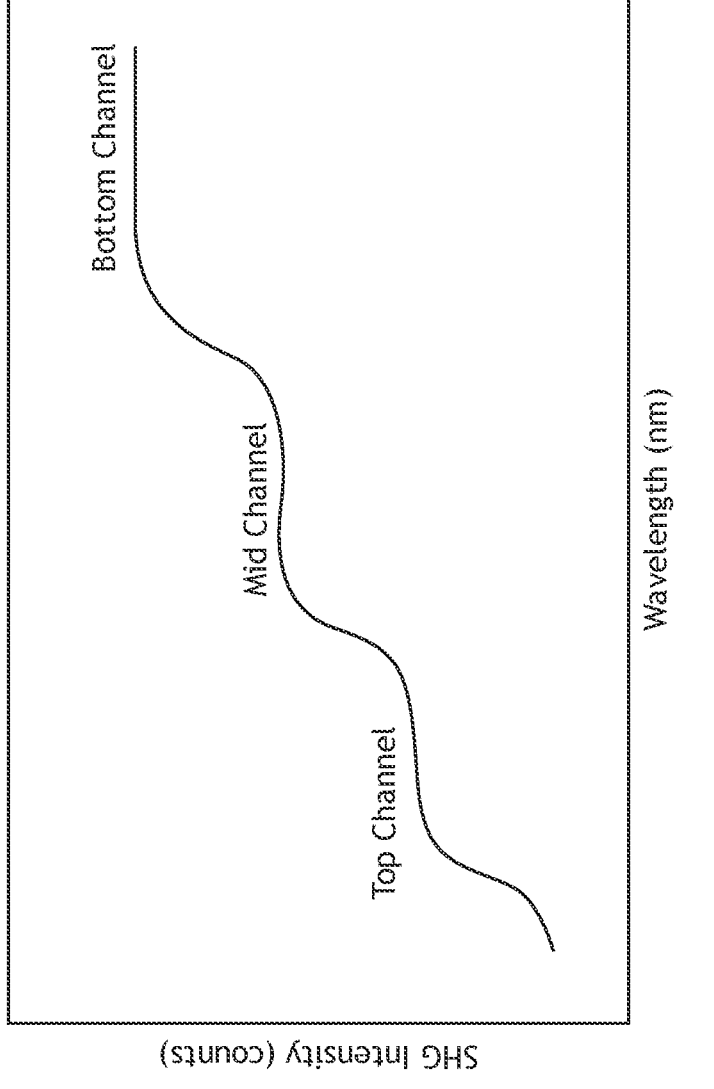
FIG. 7 is a simplified simulation of the intensity trend of interface SHG in the FET as a function of wavelength, in accordance with one or more embodiments of the present disclosure.

Referring now to FIGS. 5-7, depth-dependent interface SHG signals using wavelength tuning is described in greater detail, in accordance with one or more embodiments of the present disclosure.

It is contemplated herein that depth-dependent interface SHG information may be generated by controlling the wavelength of the illumination beam 104 (and thus the generated SHG light 114 at half the wavelength of the illumination beam 104) relative to the extinction properties of the sample 108. In particular, the extinction characteristics of the sample 108 may limit both the initial penetration depth of the illumination beam 104 into the sample 108 as well as the degree to which SHG light 114 generated below a surface may propagate out of the surface for detection.

FIG. 5 is a plot of the optical extinction coefficient (k) as a function of wavelength for silicon (e.g., a common inversion-symmetric material 302 for semiconductor applications), in accordance with one or more embodiments of the present disclosure. As depicted in FIG. 5, silicon is generally transparent at wavelengths above 380 nm and has an extinction peak around 290 nm.

FIG. 6 is a schematic side view of a gate region of a multi-channel FET 602 at an intermediate process step, in accordance with one or more embodiments of the present disclosure. For example, the FET 602 includes three channels 604*a-c* at different depths. In FIG. 6, the FET 602 includes various inversion symmetric materials 302 (e.g., silicon) as bottom and intermediate substrates surrounded by inner spacers 606, source/drain EPI regions 608, gate spacers 610, and an interfacial layer 612 (e.g., a dielectric layer such as, but not limited to, SiO$_2$). FIG. 6 further depicts different penetration depths for an illumination beam 104 with different wavelengths and the associated SHG light 114 as well as a defect 614 in a second channel 604*b* for illustration.

FIG. 7 is a simplified simulation of the intensity trend of interface SHG in the FET 602 as a function of wavelength, in accordance with one or more embodiments of the present disclosure.

As shown in FIGS. 5-7, increasing the wavelength of the illumination beam 104 may result in both increasing penetration of the illumination beam 104 and increased transmittance of the SHG light 114 at half the wavelength. In the case of silicon, the effect of increasing the wavelength is particularly pronounced when the wavelength of the SHG light 114 is approximately 290 nm (e.g., associated with the peak extinction coefficient in FIG. 6) and greater.

Further, as depicted in FIG. 6, SHG light 114 may be generated at multiple interfaces (particularly the surface-selective interfaces between an inversion-symmetric material 302 nearby materials of interest as described herein) within a given penetration depth (as defined not only by the penetration of the illumination beam 104 but the transmission strength of the SHG light 114 from that depth). As a result, the intensity of SHG light 114 may generally be based on the cumulative emission from the interfaces within the penetration depth to enable depth-dependent inspection measurements.

In some embodiments, test SHG images (and associated reference SHG images) are generated at multiple wavelengths to provide depth-resolved inspection measurements (e.g., identification of defect depth, or the like). In particular, multiple wavelengths of the illumination beam 104 may be selected such that the associated SHG light 114 is within a spectral region in which the extinction of the inversion-symmetric material 302 varies. In this way, increasing the wavelength will successively provide increasing SHG light 114 as additional interfaces of interest are characterized. As an illustration, FIG. 7 depicts increasing SHG light 114 as a function of wavelength and further depicts distinct plateaus of the SHG light 114 associated with the various channels 604 in the FET 602. In this way, the trend of the SHG light 114 as a function of wavelength may provide specific information related to the structure of the FET 602. Further, gathering cumulative information about the various interfaces enables quantitative depth-dependent defect detection (e.g., identification of defect depth) or at least separate defect detection for each of the channels 604.

In some embodiments, defects may be identified based on reference and test SHG images at a particular selected wavelength, where the wavelength may be selected to provide a known penetration depth. For example, it may not be desirable to perform a wavelength scan in some applications for reasons of measurement efficiency, or the like. In this case, reference and test SHG images associated with a measurement of SHG light 114 at a known wavelength associated with a known penetration depth may provide cumulative or average information of all interfaces of interest within the penetration depth. As an illustration, a selected wavelength known to probe all three channels of the FET 602 (e.g., a wavelength in the plateau region associated with the bottom channel as shown in FIG. 8) may provide information about all three channels, where extinction as a function of depth may be taken into account as necessary. Further, additional assumptions or knowledge about the various channels and/or the extinction trends as a function of depth may be used to generate specific information about any of the interfaces of interest.

In some embodiments, depth-resolved defect inspection is performed based on one or more difference images. For example, a difference image may be generated by subtracting a first SHG image generated with an illumination beam 104 at a first wavelength and a second SHG image generated with an illumination beam 104 at a second wavelength. Further, a reference difference image and a test difference image may be generated by subtracting first and second reference SHG images as well as subtracting first and second test SHG images, respectively. In this way, defects may be identified (e.g., in step 206) based on a comparison of the reference and test difference images.

In some embodiments, multiple difference images are generated based on different combinations of SHG images generated with different combinations of wavelengths. FIG. 8 is a schematic diagram illustrating the generation of multiple difference images associated with wavelengths $\lambda_1$ through $\lambda_4$ (e.g., as depicted in FIG. 6), in accordance with one or more embodiments of the present disclosure. In particular, FIG. 8 depicts a first difference image 802 associated with a subtraction of SHG images generated with wavelengths $\lambda_1$ and $\lambda_2$, a second difference image 804 associated with a subtraction of SHG images generated with wavelengths $\lambda_2$ and $\lambda_3$, a third difference image 806 associated with a subtraction of SHG images generated with wavelengths $\lambda_3$ and $\lambda_4$, and second difference image 808 associated with a subtraction of SHG images generated with wavelengths $\lambda_1$ and $\lambda_4$, though additional difference images associated with different wavelength combinations are within the spirit and scope of the present disclosure. Further, a set of reference difference images (e.g., the difference images 802-808 depicted in FIG. 8) may be generated based on reference SHG images and a set of test difference images (e.g., the difference images 802-808 depicted in FIG. 8) may be generated based on test SHG images. In this way, defects may be identified (e.g., in step 206) by comparing the set of reference images with the set of test images. As one illustration, reference difference images and test difference images generated using the same combination of wavelengths may be subtracted to identify defects.

Further, depth information about the defects (e.g., a precise depth value and/or an associated channel 604) may be determined using wavelength combinations. For example, difference images 802 associated with wavelengths $\lambda_1$ and $\lambda_2$ may be used to identify surface defects and/or defects associated with a first channel 604a since such wavelengths have a limited penetration depth as depicted in FIG. 6. Successively considering longer wavelengths associated with deeper penetration depths may then provide identification and quantitative depth information for successively deeper defects.

Referring now to FIGS. 9A-9D, various non-limiting examples of defects of a multi-channel FET 602 that may be detected using interface SHG techniques disclosed herein are illustrated. In particular, FIGS. 9A-9D depict defect inspection on a multi-channel FET 602 at different process steps (e.g., different stages of a fabrication process). It is contemplated herein that interface SHG may provide sensitive defect inspection on or around the inversion symmetric materials 302 at various fabrication stages. In particular, the SHG light 114 associated with the inversion-symmetric material 302 (here, silicon) may be selective to the gate region (e.g., the various channels 604 in this gate region) that are critical to the FET 602 performance and may thus selectively identify defects in these regions, which may have a high impact on the FET 602 performance (e.g., when fully fabricated).

Figure 9A:
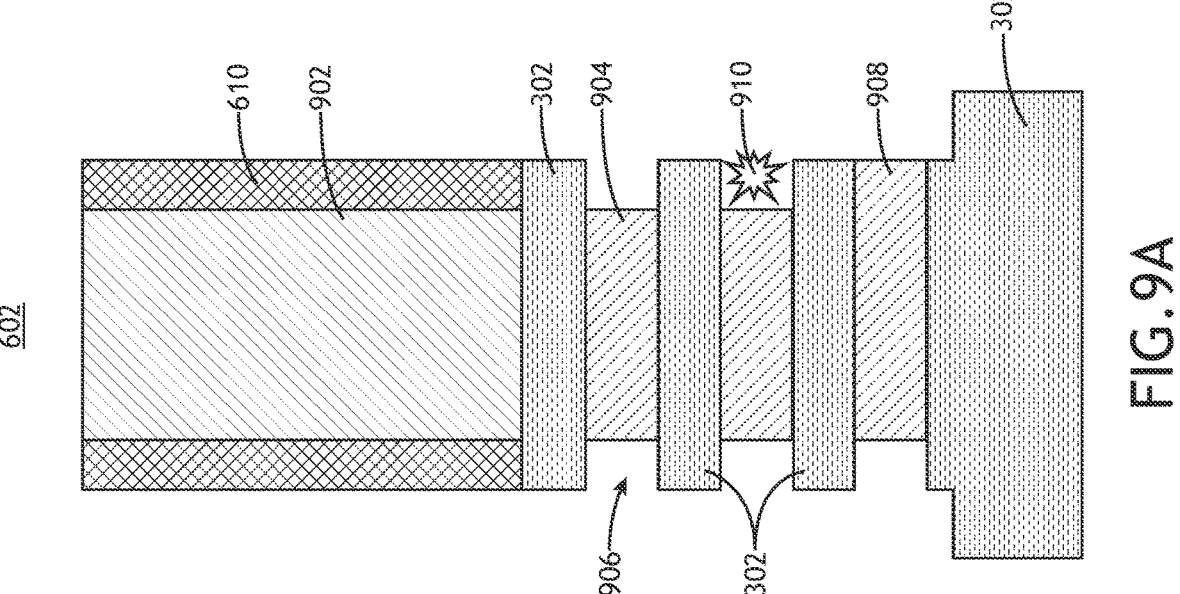
FIG. 9A is a schematic side view of a gate region of a multi-channel FET at a first illustrative process step, in accordance with one or more embodiments of the present disclosure.

FIG. 9A is a schematic side view of a gate region of a multi-channel FET 602 at a first illustrative process step, in accordance with one or more embodiments of the present disclosure. FIG. 9A illustrates various features including a dummy gate 902, inversion symmetric materials 302 associated with the channels 604, and SiGe regions 904. Such a structure may be associated with process step of etching recesses 906 in the SiGe regions 904 between inversion symmetric materials 302. Non-limiting examples of defects that may be identified by interface SHG defect based on proximity to an interface of an inversion-symmetric material 302 include, but are not limited to, an unetched region 908 (e.g., where an etch process failed) or an etch residue 910 (e.g., a SiGe residue in a recess 906).

Figure 9B:
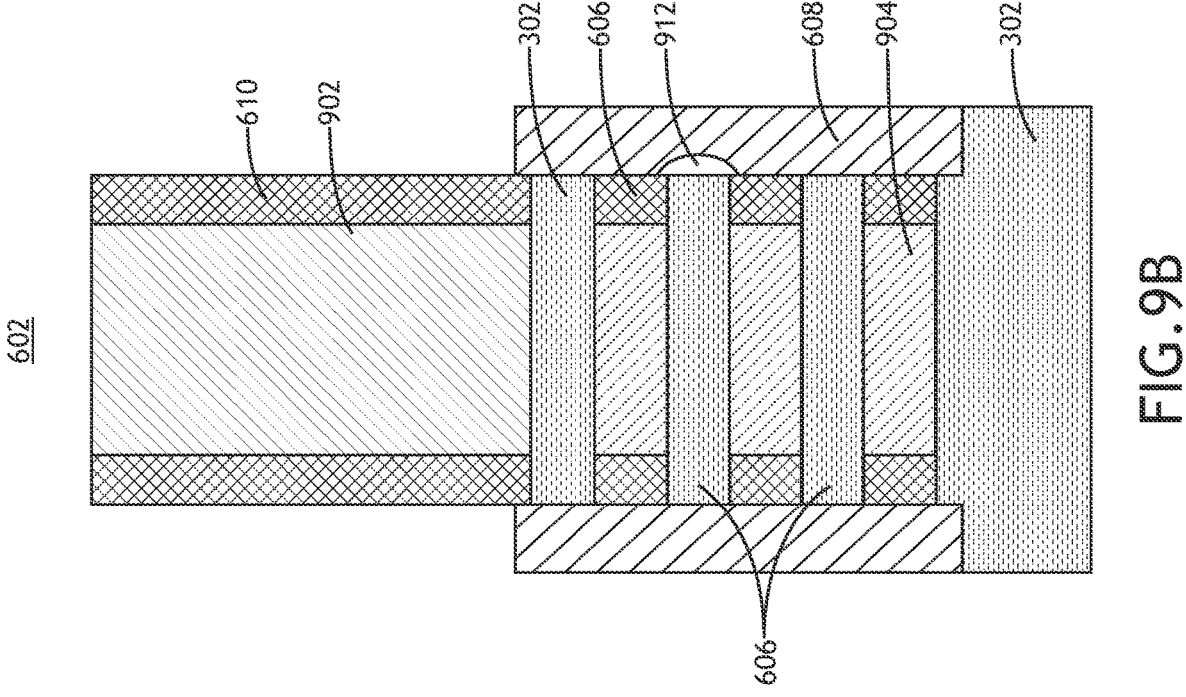
FIG. 9B is a schematic side view of a gate region of a multi-channel FET at a second illustrative process step, in accordance with one or more embodiments of the present disclosure.

FIG. 9B is a schematic side view of a gate region of a multi-channel FET 602 at a second illustrative process step, in accordance with one or more embodiments of the present disclosure. FIG. 9B is substantially similar to FIG. 9A, except that defects illustrated in FIG. 9A are not present and source/drain EPI regions 608 are illustrated. Non-limiting examples of defects that may be identified by interface SHG defect based on proximity to an interface of an inversion-symmetric material 302 at this process step include, but are not limited to, a void defect 912 in any of the source/drain EPI regions 608.

Figure 9C:
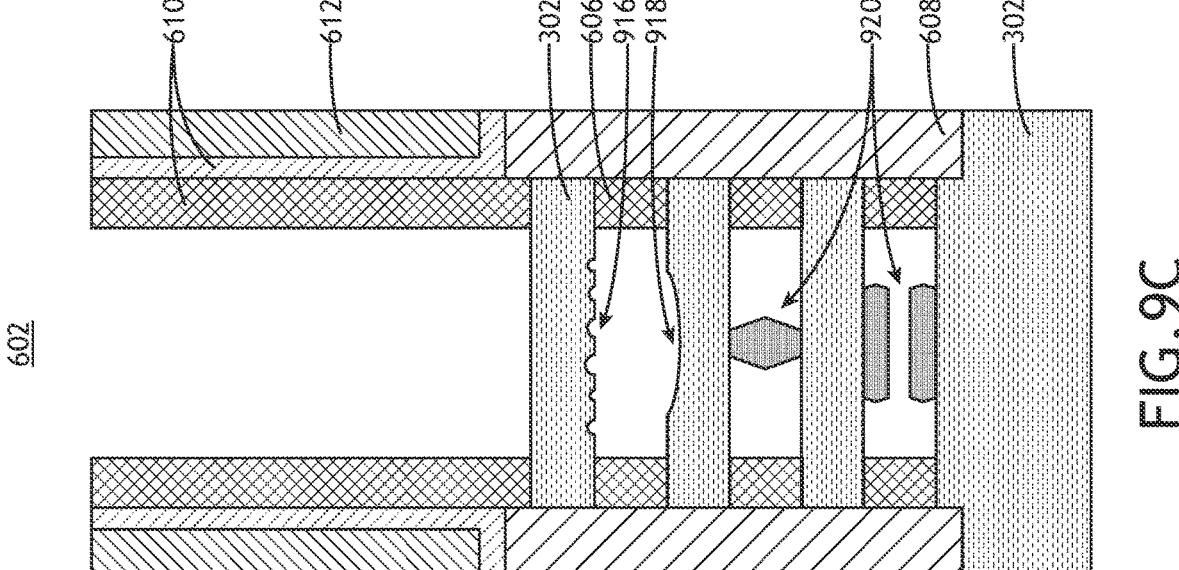
FIG. 9C is a schematic side view of a gate region of a multi-channel FET at a third illustrative process step, in accordance with one or more embodiments of the present disclosure.

FIG. 9C is a schematic side view of a gate region of a multi-channel FET 602 at a third illustrative process step, in accordance with one or more embodiments of the present disclosure. FIG. 9C is substantially similar to FIG. 9B, except that defects illustrated in FIG. 9B are not present and the dummy gate 914 and SiGe regions 904 are removed. Non-limiting examples of defects that may be identified by interface SHG defect based on proximity to an interface of an inversion-symmetric material 302 at this process step include, but are not limited to, surface roughness 916 of any of the inversion symmetric materials 302, channel bending 918, or etch residues 920 (e.g., partially or fully unetched regions).

Figure 9D:
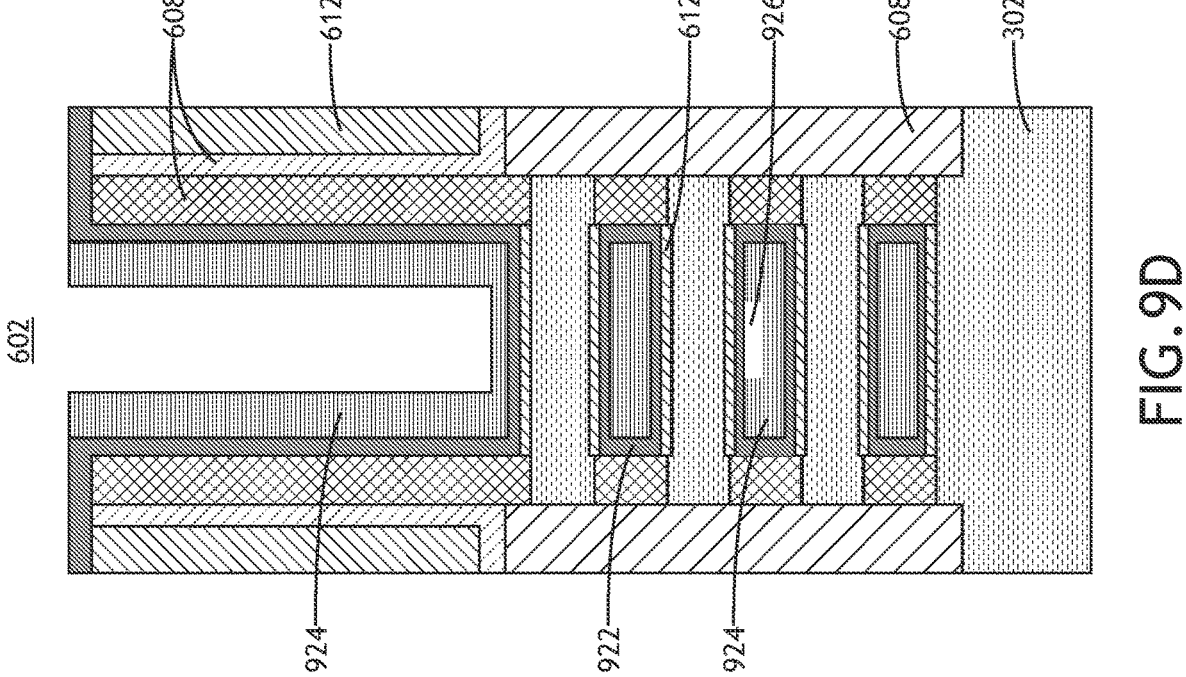
FIG. 9D is a schematic side view of a gate region of a multi-channel FET at a fourth illustrative process step, in accordance with one or more embodiments of the present disclosure.

FIG. 9D is a schematic side view of a gate region of a multi-channel FET 602 at a fourth illustrative process step, in accordance with one or more embodiments of the present disclosure. FIG. 9D is substantially similar to FIG. 9C, except that defects illustrated in FIG. 9C are not present and interfacial layers 612, high-k/IDE layers 922, as well as metal gate layers 924 are fabricated. Non-limiting examples of defects that may be identified by interface SHG defect based on proximity to an interface of an inversion-symmetric material 302 at this process step include, but are not limited to, a void defect 926 in any of the metal gate layers 924.

Referring generally to FIGS. 5-9D, it is to be understood that FIGS. 5-9D are provided solely for illustrative purposes and should not be interpreted as limiting. Rather, defect inspection using SHG light 114 from interfaces of inversion symmetric materials 302 as disclosed herein may be used to identify any type of defect that impacts the generation of such SHG light 114 and may generally include various defect types such as, but not limited to, surface roughness, surface profile distortions, voids, under-filled defects, over-filled defects, etch residues, or non-merged defects. Such defects may be on an interface of an inversion symmetric materials 302 and/or sufficiently close to the interface to impact the electric dipoles 402 associated with the generation of interface SHG light 114. In some cases, such defects are within 50 Angstroms or closer (e.g., 30 Angstroms, 20 Angstroms, or closer) to an interface. However, it is noted that these are merely examples and not limiting on the present disclosure. Further, the device types or regions that may be inspected for defects are not limited to the illustrated FET 602, but may rather include, but are not limited to, ferroelectric layers in ferroelectric FET devices, 2D layers in 2D FET devices (e.g., transition metal dichalcogenides, III-IV chalcogenides, or the like), or layers of 3D DRAM devices. Additionally, defect inspection on any non-FET device having one or more inversion symmetric materials 302 is contemplated herein.

Referring now to FIG. 2, in some embodiments, the method 200 includes a step 208 of classifying at least some of the defects based on the comparison of the one or more test SHG images to the one or more reference SHG images. As a non-limiting illustration, any of the defects depicted in FIGS. 9A-9D may be classified and distinguished in step 208. Defects may be classified based on any suitable technique.

In some embodiments, defects are classified based on design data of a structure being inspected. For example, defect locations in the test SHG images (and/or comparison images between the reference and test SHG images) may be correlated to specific features based on the design data that may include intended layouts at the relevant process step at which the images were generated. Such information may then be used to classify defects based on known defect mechanisms in the associated regions at the associated process step. Further, depth information provided based on the wavelength or combination of wavelengths used to generate the images as described previously herein may be used to further isolate the location of the defects in three dimensions to facilitate classification (e.g., based on the known defect mechanisms in the associated regions at the associated process step).

In some embodiments, defects are classified based on patterns (e.g., pattern recognition) in the test SHG images (and/or comparison images between the reference and test SHG images). For example, FIG. 9C depicted multiple defects 916-920 of different types (e.g., different classes) that may appear in a common region of a test SHG image (e.g., generated using a wavelength sufficient to interrogate at the associated depths). Such defects may induce different variations of the SHG light 114 from proximate inversion-symmetric material 302 interfaces. More particularly, different defect types may have different impacts on electric dipoles 402 associated with the generation of SHG light 114 at such interfaces based on differences in surface structure of the interface, composition of the associated materials (e.g., films 304 as broadly depicted in FIG. 3), material thickness, or the like. As a result, different defect types may generate identifiable patterns suitable for classification. Further, if multiple wavelengths are used as described previously herein, different defect types may generate patterns in one or more difference images (e.g., difference images 802-808 depicted in FIG. 8), which may all be used for defect classification.

In some embodiments, defects are classified using supervised or unsupervised machine learning techniques. For example, a supervised machine learning algorithm may be trained on any combination of reference SHG images, test SHG images of samples with known defects, comparison images (e.g., images generated by subtracting reference and test SHG images), difference images associated with different inspection wavelengths or the like. Subsequently, the trained supervised machine learning algorithm may classify defects identified on new test structures using the corresponding input images of the type used for training but generated from the new test structures. As another example, unsupervised machine learning techniques may identify defects directly based on analysis of any such inputs generated from any test structure.

In some embodiments, defects are classified based on multiple sets of reference and test SHG images generated using difference combinations or properties of an illumination beam 104, an additional illumination beam 130, or an electric field 132 (e.g., as depicted in FIG. 1B). For example, different defect types may differently impact the generation of SHG light 114 under these different inspection conditions, which may be exploited to classify the defects. Further, such multiple sets of reference and test SHG images may be used with any classification technique including the use of design data, the use of defect depth information, pattern recognition techniques, machine learning techniques, or any combination thereof.

Figure 10:
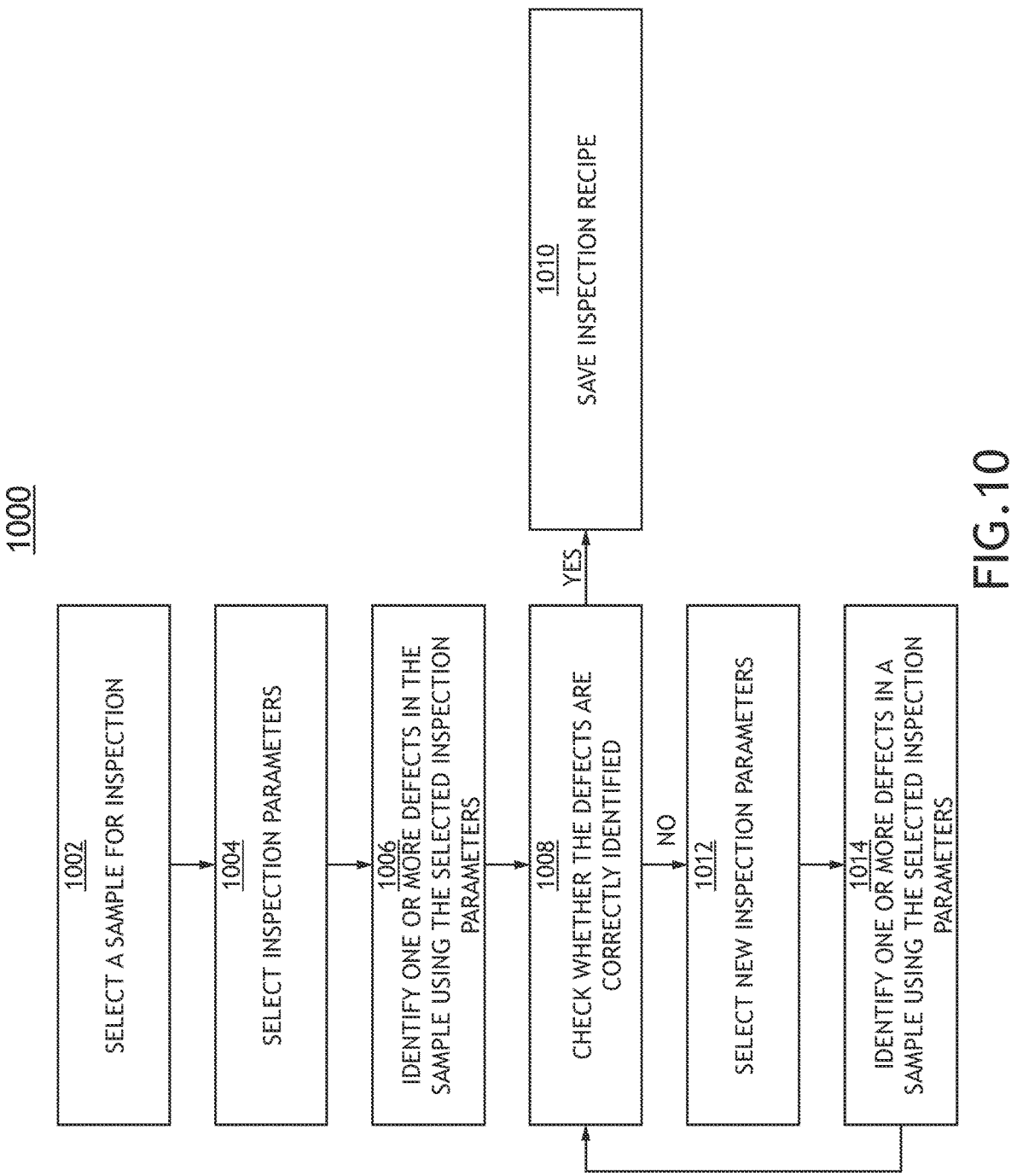
FIG. 10 is a flow diagram illustrating steps performed in a method for generating an inspection recipe, in accordance with one or more embodiments of the present disclosure.

Referring now to FIG. 10, FIG. 10 is a flow diagram illustrating steps performed in a method 1000 for generating an inspection recipe, in accordance with one or more embodiments of the present disclosure. Applicant notes that the embodiments and enabling technologies described previously herein in the context of the SHG inspection system 100 should be interpreted to extend to the method 1000. It is further noted, however, that the method 1000 is not limited to the architecture of the SHG inspection system 100. Further, the method 1000 may provide an inspection recipe for implementing the method 200 described previously herein.

An inspection recipe may generally describe various parameters of the SHG inspection system 100 during a measurement. In some embodiments, an inspection recipe includes various parameters associated with the illumination beam 104 such as, but not limited to, the intensity, wavelength, polarization, spot size on the sample 108, or incidence angle on the sample 108. In some embodiments, an inspection recipe includes various parameters associated with the collected SHG light 114 such as, but not limited to, the polarization. In some embodiments, an inspection recipe includes various parameters associated with the detector 116 such as, but not limited to, gain settings. In some embodiments, an inspection recipe includes various parameters associated with an excitation source 128 for enhancing the SHG process. For example, an inspection recipe may include various parameters associated with an additional illumination beam 130 such as, but not limited to, the intensity, wavelength, polarization, spot size on the sample 108, or incidence angle on the sample 108. As another example, an inspection recipe may include various parameters associated with an electric field 132 such as, but not limited to, an electric field strength or angle with respect to the sample 108.

In some embodiments, the method 1000 includes a step 1002 of selecting a sample 108 for inspection. The sample 108 may include any suitable structures including one inversion symmetric materials 302 suitable for providing interface SHG light 114.

In some embodiments, the method 1000 includes a step 1004 of selecting inspection parameters for inspecting the sample 108 for defects. The inspection parameters may correspond to a preliminary inspection recipe and may thus include operating parameters of the SHG inspection system 100. For example, the inspection parameters may include properties of the illumination beam 104 such as, but not limited to, a wavelength, polarization, intensity, spot size, or incidence angle. As another example, the inspection parameters may include properties of the detector 116 or the filter 126. As another example, the inspection parameters may include whether or not an excitation source 128 is used and the associated parameters of the additional illumination beam 130 and/or the electric field 132 to be used.

The inspection parameters may further include techniques for identifying and/or classifying the defects based on reference and test SHG images generated using selected parameters. In this way, the inspection parameters may include techniques for performing the method 200 or any steps therein.

In some embodiments, the method 1000 includes a step 1006 of identifying one or more defects in the sample 108 using the selected inspection parameters. For example, the step 1006 may include performing the method 200 or any steps therein.

In some embodiments, the method 1000 includes a step 1008 of checking whether the defects are correctly identified. For example, the step 1008 may include using one or more alternative inspection systems (e.g., a TEM, a SEM, a TSOM, optical bright-field imaging, or any other alternative technique) to validate the identified defects.

In some embodiments, the method 1000 includes a step 1010 of saving an inspection recipe based on the selected inspection parameters when the defects are properly identified (e.g., validated).

In some embodiments, the method 1000 includes a step 1012 of selecting new inspection parameters (e.g., a new preliminary inspection recipe). The new inspection parameters may include any new combination of parameters described with respect to step 1004. Further, the step 1012 may include additional steps such as, but not limited to, applying additional algorithms or machine learning techniques to identify inspection parameters suitable for inspection of the particular sample 108.

In some embodiments, step 1008 is repeated with the new parameters. If successful, the inspection recipe may be saved (e.g., step 1010). If unsuccessful, the steps 1012, 1014, and 1008 may be repeated any number of times. For example, the steps 1012, 1014, and 1008 may be repeated until inspection parameters are found that correctly identify defects on the sample 108 that may be validated by one or more additional inspection systems.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An inspection system, comprising:
a controller communicatively coupled to a detector of an optical sub-system, the controller including one or more processors configured to execute program instructions causing the one or more processors to perform an inspection recipe by:
receiving one or more reference SHG images of one or more reference structures based on signals from the detector during a scan of the one or more reference structures with an illumination beam and collecting second harmonic generation (SHG) light in response to the illumination beam, wherein each of the one or more reference structures includes a multilayer structure including one or more inversion-symmetric materials and one or more films of additional materials, wherein the SHG light is associated with one or more interfaces between the one or more inversion-symmetric materials and one or more additional features of the one or more films,
wherein the one or more interfaces includes one or more electric dipoles associated with a breakage of inversion symmetry at the one or more interfaces,
wherein at least one of a number or a concentration of the one or more electric dipoles is controlled by an interdigitated electrode (IDE) layer;
receiving one or more test SHG images of one or more test structures on a sample based on signals from the detector during a scan of the one or more test structures with the illumination beam and collecting the SHG light in response to the illumination beam, wherein the one or more test structures and the one or more reference structures have a common design; and
identifying defects in the one or more test structures by comparing the one or more test SHG images to the one or more reference SHG images.

2. The inspection system of claim 1, wherein the one or more processors are further configured to perform the inspection recipe by:
classifying at least one of the defects based on at least one of a known design of the test structure, an identifiable pattern in the one or more test SHG images associated with a known class of defects, or a machine learning algorithm trained on additional SHG images with known defects of known classes.

3. The inspection system of claim 1, wherein the defects comprise:
at least one of surface roughness, surface profile distortions, voids, under-filled defects, over-filled defects, etch residues, or non-merged defects in the multilayer structure.

4. The inspection system of claim 1, wherein a spot size of the illumination beam on the sample is extended along a direction perpendicular to a scan direction.

5. The inspection system of claim 1, further comprising:
an additional illumination source to generate an additional illumination beam; and
one or more optical elements configured to direct the additional illumination beam to the sample, wherein the illumination beam and the additional illumination beam overlap during the scan of the one or more test structures, wherein a spectrum of the additional illumination beam is selected to enhance the SHG light.

6. The inspection system of claim 1, further comprising:
an electric field source to generate an electric field on the sample, wherein the electric field enhances the SHG light.

7. The inspection system of claim 1, wherein the one or more reference structures comprise a single reference structure, wherein the one or more reference SHG images are associated with the single reference structure.

8. The inspection system of claim 1, wherein the one or more reference structures comprise two or more reference structures, wherein the one or more reference SHG images are associated with the two or more reference structures.

9. The inspection system of claim 1, wherein a spectrum of the illumination beam is tunable.

10. The inspection system of claim 9, wherein the one or more processors are further configured to execute program instructions causing the one or more processors to:
generate two or more sets of the reference and test SHG images based on different wavelengths of the illumination beam; and
identifying a depth of at least one defect based on the two or more sets of the reference and test SHG images.

11. The inspection system of claim 10, wherein identifying the depth of at least one defect based on the two or more sets of the reference and test SHG images comprises:
generating difference images between at least some of the test SHG images associated with the different wavelengths; and
identifying the depth of at least one defect based on the difference images.

12. The inspection system of claim 1, wherein the multi-layer structure is associated with at least one of a field effect transistor (FET) or a memory device.

13. The inspection system of claim 12, wherein the multi-layer structure is associated with a gate region of at least one of a metal-oxide-semiconductor FET (MOSFET), a planar FET, a FinFET, a gate-all-around (GAA) FET, a GAA nanosheet FET, a fork-sheet FET, a complementary nanosheet FET, a ferroelectric FET, a 2D FET, or a 3D FET.

14. The inspection system of claim 12, wherein the multi-layer structure is associated with at least one of a ferroelectric memory device or a 3D dynamic random access memory (DRAM) device.

15. The inspection system of claim 1, wherein the one or more processors are further configured to execute program instructions causing the one or more processors to:
generate two or more sets of the reference and test SHG images based on different wavelengths of the illumination beam; and
identifying a depth of at least one defect based on the two or more sets of the reference and test SHG images.

16. The inspection system of claim 15, wherein the multi-layer structure is associated with a field-effect transistor (FET), wherein the FET includes two or more channels in a gate region, wherein identifying the depth of at least one defect based on the two or more sets of the reference and test SHG images comprises:
identifying a channel in which the at least one defect is located.

17. The inspection system of claim 1, wherein the one or more additional features comprise:
at least one of a high-k layer, an interfacial dipole engineering layer, a metal gate, or a SiGe region.

18. The inspection system of claim 1, wherein the one or more inversion-symmetric materials comprise:
silicon.

19. An inspection system, comprising:
one or more illumination sources to generate an illumination beam;
an illumination sub-system including one or more lenses configured to direct the illumination beam to a sample at an off-axis incidence angle;
a scanning sub-system including at least one of one or more translation stages or one or more optical elements configured to further scan the illumination beam with respect to the sample along a scan direction;
a filter configured to block a spectrum of the illumination beam and allow a spectrum associated with second harmonic generation (SHG) of the illumination beam by at least a portion of the sample;
a detector to capture light associated with a second harmonic of the illumination beam; and
a controller communicatively coupled to the detector, the controller including one or more processors configured to execute program instructions causing the one or more processors to perform an inspection recipe by:
receiving one or more reference SHG images of one or more reference structures based on signals from the detector during a scan of the one or more reference structures with the illumination beam and collecting SHG light in response to the illumination beam, wherein each of the one or more reference structures includes a multilayer structure including one or more inversion-symmetric materials and one or more films of additional materials, wherein the SHG light is associated with one or more interfaces between the one or more inversion-symmetric materials and one or more additional features of the one or more films,
wherein the one or more interfaces includes one or more electric dipoles associated with a breakage of inversion symmetry at the one or more interfaces,
wherein at least one of a number or a concentration of the one or more electric dipoles is controlled by an inter-digitated electrode (IDE) layer;
receiving one or more test SHG images of one or more test structures on the sample based on signals from the detector during a scan of the one or more test structures with the illumination beam and collecting the SHG light in response to the illumination beam, wherein the one or more test structures and the one or more reference structures have a common design; and
identifying defects in the one or more test structures by comparing the one or more test SHG images to the one or more reference SHG images.

20. The inspection system of claim 19, further comprising:
a first polarizer to control a polarization of the illumination beam incident on the sample; and
a second polarizer to control a polarization of the SHG light incident on the detector.

21. The inspection system of claim 20, wherein an orientation of at least one of the first polarizer or the second polarizer is adjusted to maximize an intensity of the SHG light detected by the detector.

22. The inspection system of claim 19, wherein the detector comprises:
at least one of a photo-multiplier tube, a charge-coupled device, or a photodiode.

23. The inspection system of claim 19, wherein the scanning sub-system includes the one or more translation stages, wherein the one or more translation stages control a position of the sample.

24. The inspection system of claim 19, wherein the scanning sub-system includes the one or more optical elements, wherein the one or more optical elements control a position of the illumination beam.

25. The inspection system of claim 19, wherein the one or more processors are further configured to perform the inspection recipe by:

classifying at least one of the defects based on at least one of a known design of the test structure, an identifiable pattern in the one or more test SHG images associated with a known class of defects, or a machine learning algorithm trained on additional SHG images with known defects of known classes.

26. The inspection system of claim 19, wherein the defects comprise:

at least one of surface roughness, surface profile distortions, voids, under-filled defects, over-filled defects, etch residues, or non-merged defects in the multilayer structure.

27. The inspection system of claim 19, wherein a spot size of the illumination beam on the sample is extended along a direction perpendicular to the scan direction.

28. The inspection system of claim 19, further comprising:

an additional illumination source to generate an additional illumination beam; and one or more optical elements configured to direct the additional illumination beam to the sample, wherein the illumination beam and the additional illumination beam overlap during the scan, wherein a spectrum of the additional illumination beam is selected to enhance the SHG light.

29. The inspection system of claim 19, further comprising:

an electric field source to generate an electric field on the sample, wherein the electric field enhances the SHG light.

30. The inspection system of claim 19, wherein the one or more reference structures comprise a single reference structure, wherein the one or more reference SHG images are associated with the single reference structure.

31. The inspection system of claim 19, wherein the one or more reference structures comprise two or more reference structures, wherein the one or more reference SHG images are associated with the two or more reference structures.

32. The inspection system of claim 19, wherein a spectrum of the illumination beam is tunable.

33. The inspection system of claim 32, wherein the one or more processors are further configured to execute program instructions causing the one or more processors to:

generate two or more sets of the reference and test SHG images based on different wavelengths of the illumination beam; and identifying a depth of at least one defect based on the two or more sets of the reference and test SHG images of SHG images.

34. The inspection system of claim 33, wherein identifying the depth of at least one defect based on the two or more sets of the reference and test SHG images of SHG images comprises:

generating difference images between at least some of the test SHG images associated with the different wavelengths; and identifying the depth of at least one defect based on the difference images.

35. The inspection system of claim 19, wherein the multi-layer structure is associated with at least one of a field effect transistor (FET) or a memory device.

36. The inspection system of claim 35, wherein the multi-layer structure is associated with a gate region of at least one of a metal-oxide-semiconductor FET (MOSFET), a planar FET, a FinFET, a gate-all-around (GAA) FET, a GAA nanosheet FET, a fork-sheet FET, a complementary nanosheet FET, a ferroelectric FET, a 2D FET, or a 3D FET.

37. The inspection system of claim 35, wherein the multi-layer structure is associated with at least one of a ferroelectric memory device or a 3D dynamic random access memory (DRAM) device.

38. The inspection system of claim 35, wherein the one or more additional features comprise:

at least one of a high-k layer, an interfacial dipole engineering layer, a metal gate, or a SiGe region.

39. The inspection system of claim 38, wherein the inversion-symmetric substrate comprises:

silicon.

40. The inspection system of claim 19, wherein the one or more processors are further configured to execute program instructions causing the one or more processors to:

generate two or more sets of the reference and test SHG images based on different wavelengths of the illumination beam; and identifying a depth of at least one defect based on the two or more sets of the reference and test SHG images.

41. The inspection system of claim 40, wherein the multi-layer structure is associated with a field-effect transistor (FET), wherein the FET includes two or more channels in a gate region, wherein identifying the depth of the at least one defect based on the two or more sets of the reference and test SHG images of SHG images comprises:

identifying a channel in which the at least one defect is located.

42. A method, comprising:

generating one or more reference SHG images of one or more reference structures based on signals from a detector during a scan of the one or more reference structures with an illumination beam and collecting second harmonic generation (SHG) light in response to the illumination beam, wherein each of the one or more reference structures includes a multilayer structure including one or more inversion-symmetric materials and one or more films of additional materials, wherein the SHG light is associated with one or more interfaces between the one or more inversion-symmetric materials and one or more additional features of the one or more films, wherein the one or more interfaces includes one or more electric dipoles associated with a breakage of inversion symmetry at the one or more interfaces, wherein at least one of a number or a concentration of the one or more electric dipoles is controlled by an inter-digitated electrode (IDE) layer;

generating one or more test SHG images of one or more test structures based on signals from the detector during a scan of the one or more test structures with the illumination beam and collecting the SHG light in response to the illumination beam, wherein the one or more test structures and the one or more reference structures have a common design; and identifying defects in the one or more test structures by comparing the one or more test SHG images to the one or more reference SHG images.

43. The method of claim 42, further comprising:

classifying at least one of the defects based on at least one of a known design of the multilayer structure, an identifiable pattern in the SHG image associated with a known class of defects, or a machine learning algorithm trained on additional SHG images with known defects of known classes.

44. The method of claim 42, wherein a spectrum of the illumination beam is tunable.

45. The method of claim 44, further comprising:

generating two or more sets of the reference and test SHG images based on different wavelengths of the illumination beam; and identifying a depth of at least one defect based on the two or more sets of the reference and test SHG images of SHG images.

46. The method of claim 45, wherein identifying the depth of at least one defect based on the two or more sets of the reference and test SHG images of SHG images comprises:

generating difference images between at least some of the test SHG images associated with the different wavelengths; and identifying the depth of at least one defect based on the difference images.

* * * * *